United States Patent
Visco et al.

(10) Patent No.: US 9,905,860 B2
(45) Date of Patent: Feb. 27, 2018

(54) WATER ACTIVATED BATTERY SYSTEM HAVING ENHANCED START-UP BEHAVIOR

(71) Applicant: PolyPlus Battery Company, Berkeley, CA (US)

(72) Inventors: Steven J. Visco, Berkeley, CA (US); Lutgard C. De Jonghe, Lafayette, CA (US); Vitaliy Nimon, San Francisco, CA (US); Alexei Petrov, Walnut Creek, CA (US); Ian Wogan, Oakland, CA (US); Yevgeniy S. Nimon, Danville, CA (US); Bruce D. Katz, Moraga, CA (US)

(73) Assignee: POLYPLUS BATTERY COMPANY, Berkeley, CA (US)

( * ) Notice: Subject to any disclaimer, the term of this patent is extended or adjusted under 35 U.S.C. 154(b) by 819 days.

(21) Appl. No.: 14/317,677

(22) Filed: Jun. 27, 2014

(65) Prior Publication Data
US 2015/0004457 A1    Jan. 1, 2015

Related U.S. Application Data

(60) Provisional application No. 61/841,181, filed on Jun. 28, 2013.

(51) Int. Cl.
*H01M 6/34* (2006.01)
*H01M 4/06* (2006.01)
*H01M 4/38* (2006.01)

(52) U.S. Cl.
CPC .............. *H01M 6/34* (2013.01); *H01M 4/06* (2013.01); *H01M 4/382* (2013.01); *H01M 2220/20* (2013.01)

(58) Field of Classification Search
CPC ...................................................... H01M 6/34
(Continued)

(56) References Cited

U.S. PATENT DOCUMENTS 2,970,180 A * 1/1961 Urry ................ H01M 6/38
429/118
2,996,562 A    8/1961 Meyers
(Continued)

FOREIGN PATENT DOCUMENTS

CA    2618635    4/2012
EP    0111213    11/1983
(Continued)

OTHER PUBLICATIONS

U.S. Appl. No. 14/156,267, Notice of Allowance dated Mar. 9, 2016.
(Continued)

*Primary Examiner* — Maria Laios
*Assistant Examiner* — Robert S Carrico
(74) *Attorney, Agent, or Firm* — Weaver Austin Villeneuve & Sampson LLP

(57) ABSTRACT

A water activated lithium battery cell having a thermal agent component for warming up cell components upon deployment. Also a water-activated battery system that is adapted to operate in and/or on the surface of a waterbody (i.e., a body of water including those which are natural or man made). In various embodiments the battery system comprises an operably breachable hermetic enclosure and at least one lithium battery cell having an open-cathode architecture, the lithium cell disposed inside the hermetic enclosure and therein maintained in an open ionic circuit condition (i.e., an inactive state) throughout battery system storage. Moreover, optionally, a thermal agent may be disposed inside the hermetic enclosure for warming up one or more battery cell components, the agent typically water activated, which is to mean that it (the thermal agent) evolves heat by reacting with water.

11 Claims, 14 Drawing Sheets

(58) Field of Classification Search
USPC .......................................................... 429/119
See application file for complete search history.

(56) References Cited

U.S. PATENT DOCUMENTS

| | | | |
|---|---|---|---|
| 3,343,988 A | 9/1967 | Friend, Jr. | |
| 3,423,245 A * | 1/1969 | Waller | H01M 6/34 |
| | | | 429/119 |
| 3,466,194 A | 9/1969 | Duddy | |
| 3,528,856 A | 9/1970 | Ovshinsky | |
| 3,625,769 A | 7/1971 | Lyall | |
| 3,607,417 A | 9/1971 | McRae et al. | |
| 3,615,835 A | 10/1971 | Ovshinsky | |
| 3,703,415 A | 11/1972 | Mitoff et al. | |
| 3,912,536 A | 10/1975 | Galli et al. | |
| 3,966,497 A | 6/1976 | Honer | 429/119 |
| 3,976,509 A | 8/1976 | Tsai et al. | |
| 4,007,057 A | 2/1977 | Littauer et al. | |
| 4,007,316 A * | 2/1977 | Koontz | H01M 4/36 |
| | | | 429/118 |
| 4,016,339 A | 4/1977 | Gray | |
| 4,020,247 A | 4/1977 | Birt et al. | 429/119 |
| 4,091,182 A | 5/1978 | Farrington et al. | |
| 4,162,202 A | 7/1979 | Dey | |
| 4,163,084 A | 7/1979 | Tsai et al. | |
| 4,185,143 A | 1/1980 | Birt et al. | 429/119 |
| 4,210,707 A | 7/1980 | Farrington | |
| 4,269,907 A | 5/1981 | Momyer et al. | 429/67 |
| 4,401,731 A | 8/1983 | Steinleitner | |
| 4,402,995 A | 9/1983 | Fleischer | |
| 4,405,416 A | 9/1983 | Raistrick et al. | |
| 4,414,293 A | 11/1983 | Joy et al. | |
| 4,504,561 A | 3/1985 | Winsel | |
| 4,628,420 A | 12/1986 | McArthur | 362/208 |
| 4,735,630 A | 4/1988 | Planchat | 429/70 |
| 4,828,942 A | 5/1989 | Licht | |
| 4,833,048 A | 5/1989 | De Jonghe et al. | |
| 4,916,036 A | 4/1990 | Cheiky | |
| 4,917,974 A | 4/1990 | Visco et al. | |
| 4,981,672 A | 1/1991 | De Neufville et al. | |
| 4,985,317 A | 1/1991 | Adachi et al. | |
| 5,035,963 A | 7/1991 | Plichta | |
| 5,100,523 A | 3/1992 | Helms et al. | |
| 5,108,856 A | 4/1992 | Shuster | |
| 5,162,175 A | 11/1992 | De Jonghe et al. | |
| 5,166,011 A | 11/1992 | Rao et al. | |
| 5,198,081 A | 3/1993 | Kanoh et al. | |
| 5,213,908 A | 5/1993 | Hagedorn | |
| 5,314,765 A | 5/1994 | Bates | |
| 5,336,384 A | 8/1994 | Tsou et al. | |
| 5,338,625 A | 8/1994 | Bates et al. | |
| 5,342,710 A | 8/1994 | Koksbang | |
| 5,368,702 A | 11/1994 | De Nora | |
| 5,387,479 A | 2/1995 | Koksbang | |
| 5,409,786 A | 4/1995 | Bailey | |
| 5,413,881 A | 5/1995 | Licht et al. | |
| 5,427,873 A | 6/1995 | Shuster | |
| 5,455,126 A | 10/1995 | Bates et al. | |
| 5,506,068 A | 4/1996 | Dan et al. | |
| 5,510,209 A | 4/1996 | Abraham et al. | |
| 5,512,147 A | 4/1996 | Bates et al. | |
| 5,516,598 A | 5/1996 | Chu et al. | |
| 5,523,179 A | 6/1996 | Chu | |
| 5,525,442 A | 6/1996 | Shuster | |
| 5,532,077 A | 7/1996 | Chu | |
| 5,567,210 A | 10/1996 | Bates | |
| 5,569,520 A | 10/1996 | Bates | |
| 5,571,600 A | 11/1996 | Licht | |
| 5,582,623 A | 12/1996 | Chu | |
| 5,597,660 A | 1/1997 | Bates et al. | |
| 5,612,152 A | 3/1997 | Bates | |
| 5,648,183 A | 7/1997 | Licht et al. | |
| 5,648,187 A | 7/1997 | Skotheim | |
| 5,652,068 A | 7/1997 | Shuster et al. | |
| 5,665,481 A | 9/1997 | Shuster et al. | |
| 5,686,201 A | 11/1997 | Chu | |
| 5,693,212 A | 12/1997 | Mazanec et al. | |
| 5,696,201 A | 12/1997 | Cavalloni et al. | |
| 5,702,995 A | 12/1997 | Fu | |
| 5,789,108 A | 8/1998 | Chu | |
| 5,814,420 A | 9/1998 | Chu | |
| 5,882,812 A | 3/1999 | De Jonghe et al. | |
| 5,961,672 A | 10/1999 | Skotheim et al. | |
| 5,962,171 A | 10/1999 | Boguslaysky et al. | |
| 6,017,651 A | 1/2000 | Chu et al. | |
| 6,025,094 A | 2/2000 | Visco et al. | |
| 6,025,095 A | 2/2000 | Kawamura | |
| 6,030,720 A | 2/2000 | Chu et al. | |
| 6,030,909 A | 2/2000 | Fu | |
| 6,066,417 A | 5/2000 | Cho et al. | |
| 6,068,950 A | 5/2000 | Gan et al. | |
| 6,096,447 A | 8/2000 | Gan et al. | |
| 6,110,236 A | 8/2000 | Chu et al. | |
| 6,146,787 A | 11/2000 | Harrup et al. | |
| 6,165,644 A | 12/2000 | Chu et al. | |
| 6,183,901 B1 | 2/2001 | Ying et al. | |
| 6,198,701 B1 | 3/2001 | De Jonghe et al. | |
| 6,200,701 B1 | 3/2001 | Gan et al. | |
| 6,200,704 B1 | 3/2001 | De Jonghe et al. | |
| 6,203,942 B1 | 3/2001 | Gan et al. | |
| 6,203,947 B1 | 3/2001 | Peled et al. | |
| 6,207,324 B1 | 3/2001 | Licht | |
| 6,210,832 B1 | 4/2001 | Chu et al. | |
| 6,214,061 B1 | 4/2001 | Visco et al. | |
| 6,218,050 B1 | 4/2001 | Yoon et al. | |
| 6,225,002 B1 | 5/2001 | Chu et al. | |
| 6,228,527 B1 | 5/2001 | Medeiros et al. | |
| 6,248,481 B1 | 6/2001 | De Jonghe et al. | |
| 6,274,269 B1 | 8/2001 | Gan et al. | |
| 6,280,598 B1 | 8/2001 | Barton et al. | |
| 6,296,958 B1 | 10/2001 | Pinto et al. | |
| 6,315,881 B1 | 11/2001 | Fu | |
| 6,358,643 B1 | 3/2002 | Katz et al. | |
| 6,358,651 B1 | 3/2002 | Chen et al. | |
| 6,376,123 B1 | 4/2002 | Chu | |
| 6,383,347 B1 | 5/2002 | Stuart et al. | |
| 6,391,492 B1 | 5/2002 | Kawakami et al. | |
| 6,402,795 B1 | 6/2002 | Chu et al. | |
| 6,413,284 B1 | 7/2002 | Chu et al. | |
| 6,413,285 B1 | 7/2002 | De Jonghe et al. | |
| 6,432,584 B1 | 8/2002 | Visco et al. | |
| 6,475,677 B1 | 11/2002 | Inda et al. | |
| 6,485,622 B1 | 11/2002 | Fu | |
| 6,489,055 B1 | 12/2002 | Ichihashi et al. | |
| 6,495,285 B2 | 12/2002 | Gan et al. | |
| 6,511,772 B2 | 1/2003 | Gan et al. | |
| 6,537,698 B2 | 3/2003 | Gan et al. | |
| 6,537,701 B1 | 3/2003 | Chu et al. | |
| 6,562,514 B1 | 5/2003 | Kazacos et al. | |
| 6,632,573 B1 | 10/2003 | Nimon et al. | |
| 6,723,140 B2 | 4/2004 | Chu et al. | |
| 6,733,924 B2 | 5/2004 | Skotheim et al. | |
| 6,737,197 B2 | 5/2004 | Chu et al. | |
| 6,766,817 B2 | 6/2004 | Da Silva | |
| 6,770,187 B1 | 8/2004 | Putter et al. | |
| 6,797,428 B1 | 9/2004 | Skotheim et al. | |
| 6,835,492 B2 | 12/2004 | Cho et al. | |
| 6,911,280 B1 | 6/2005 | De Jonghe et al. | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,211,351 B2 | 5/2007 | Klaassen | |
| 7,211,532 B2 | 5/2007 | Fu | |
| 7,247,408 B2 | 7/2007 | Skotheim | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,344,804 B2 | 3/2008 | Klaassen | |
| 7,390,591 B2 | 6/2008 | Visco et al. | |
| 7,432,017 B2 | 10/2008 | Visco et al. | |
| 7,491,458 B2 | 2/2009 | Visco et al. | |
| 7,582,385 B2 | 9/2009 | Clarke | |
| 7,608,178 B2 | 10/2009 | De Jonghe et al. | |
| 7,645,543 B2 | 1/2010 | Visco et al. | |

(56) References Cited

U.S. PATENT DOCUMENTS

| | | |
|---|---|---|
| 7,666,233 B2 | 2/2010 | Visco et al. |
| 7,771,870 B2 | 8/2010 | Affinito et al. |
| 7,781,108 B2 | 8/2010 | Visco et al. |
| 7,824,806 B2 | 11/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,570 B2 | 11/2011 | Visco et al. |
| 8,048,571 B2 | 11/2011 | Visco et al. |
| 8,114,171 B2 | 2/2012 | Visco et al. |
| 8,129,052 B2 | 3/2012 | Visco et al. |
| 8,182,943 B2 | 5/2012 | Visco et al. |
| 8,202,649 B2 | 6/2012 | Visco et al. |
| 8,293,398 B2 | 10/2012 | Visco et al. |
| 8,323,820 B2 | 12/2012 | Visco et al. |
| 8,334,075 B2 | 12/2012 | Visco et al. |
| 8,361,664 B2 | 1/2013 | Visco et al. |
| 8,389,147 B2 | 3/2013 | Visco et al. |
| 8,404,388 B2 | 3/2013 | Visco et al. |
| 8,455,131 B2 | 6/2013 | Visco et al. |
| 8,828,580 B2 | 9/2014 | Visco et al. |
| 9,123,941 B2 | 9/2015 | Visco et al. |
| 9,287,573 B2 | 3/2016 | Visco et al. |
| 9,368,775 B2 | 6/2016 | Visco et al. |
| 9,419,299 B2 | 8/2016 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0034678 A1 | 3/2002 | Shibuya et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2002/0110728 A1 | 8/2002 | Gozdz et al. |
| 2003/0082445 A1 | 5/2003 | Smith et al. |
| 2003/0134198 A1 | 7/2003 | Sawa et al. |
| 2003/0143456 A1 | 7/2003 | Kazacos et al. |
| 2003/0190501 A1 | 10/2003 | Rendina |
| 2003/0224234 A1 | 12/2003 | Steele et al. |
| 2004/0067417 A1 | 4/2004 | Oosawa et al. |
| 2004/0081894 A1 | 4/2004 | Nimon et al. |
| 2004/0101761 A1 | 5/2004 | Park et al. |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191604 A1 | 9/2004 | Artibase et al. |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | Jonghe et al. |
| 2005/0147883 A1 | 7/2005 | Kubota |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0037058 A1 | 2/2007 | Visco et al. |
| 2007/0051620 A1 | 3/2007 | Visco et al. ............ 204/280 |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0172739 A1 | 7/2007 | Visco et al. |
| 2007/0231704 A1 | 10/2007 | Inda |
| 2007/0259234 A1 | 11/2007 | Chua et al. |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2008/0124433 A1 | 5/2008 | Yelden et al. |
| 2008/0161746 A1 | 7/2008 | Visco et al. |
| 2008/0182157 A1 | 7/2008 | Visco et al. |
| 2009/0239152 A1 | 9/2009 | Katoh ............ 429/319 |
| 2009/0286114 A1 | 11/2009 | Visco et al. |
| 2009/0297935 A1 | 12/2009 | Visco et al. |
| 2010/0104934 A1 | 4/2010 | Visco et al. |
| 2010/0112454 A1 | 5/2010 | Visco et al. |
| 2010/0203394 A1 | 8/2010 | Bae et al. ............ 429/246 |
| 2011/0014522 A1 | 1/2011 | Visco et al. |
| 2011/0039144 A1 | 2/2011 | Visco et al. |
| 2011/0269007 A1 | 11/2011 | Visco et al. |
| 2011/0269031 A1 | 11/2011 | Visco et al. |
| 2012/0009469 A1 | 1/2012 | Visco et al. |
| 2012/0094188 A1 | 4/2012 | Visco et al. |
| 2012/0094194 A1 | 4/2012 | Visco et al. |
| 2014/0272524 A1 | 9/2014 | Visco et al. |
| 2015/0004457 A1 | 1/2015 | Visco et al. |
| 2015/0024251 A1 | 1/2015 | Visco et al. |
| 2015/0340720 A1 | 11/2015 | Visco et al. |
| 2016/0028053 A1 | 1/2016 | Visco et al. |
| 2016/0028063 A1 | 1/2016 | Visco et al. |
| 2016/0197326 A1 | 7/2016 | Visco et al. |

FOREIGN PATENT DOCUMENTS

| | | |
|---|---|---|
| EP | 0111214 | 11/1983 |
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 57-003371 | 1/1982 |
| JP | 57-017568 | 1/1982 |
| JP | 57-172660 | 10/1982 |
| JP | 62-243247 | 10/1987 |
| JP | 63-198261 | 8/1988 |
| JP | 09-320645 | 12/1997 |
| JP | 2001-313025 | 11/2001 |
| JP | 2001-351615 | 12/2001 |
| JP | 2002-513991 | 5/2002 |
| JP | 2002-518796 | 6/2002 |
| KR | 10/2001-0024927 | 3/2001 |
| KR | 2001-0043145 | 5/2001 |
| WO | 98/28811 | 7/1998 |
| WO | 99/57770 | 11/1999 |
| WO | 00/51198 | 8/2000 |
| WO | 01/39302 | 5/2001 |
| WO | 2001/033651 | 5/2001 |
| WO | 02/50933 | 6/2002 |
| WO | 2002/095849 | 11/2002 |
| WO | 2004/001879 | 12/2003 |
| WO | 2004/036669 | 4/2004 |
| WO | 2004/109823 | 12/2004 |
| WO | 05/038953 | 4/2005 |
| WO | 05/038962 | 4/2005 |
| WO | 2005/038953 | 4/2005 |
| WO | 2005/083829 | 9/2005 |
| WO | 2009/102982 | 8/2009 |

OTHER PUBLICATIONS

U.S. Appl. No. 14/809,083, Office Action dated Apr. 4, 2016.
U.S. Appl. No. 14/815,672, Office Action dated Apr. 29, 2016.
JP patent application No. 2014-108250, Notification of Reasons for Rejection dated Feb. 23, 2016.
U.S. Appl. No. 14/815,672, Notice of Allowance dated May 25, 2016.
U.S. Appl. No. 14/994,011, Office Action dated Jul. 1, 2016.
U.S. Appl. No. 15/150,231, Office Action dated Sep. 1, 2016.
U.S. Appl. No. 15/173,303, Office Action dated Oct. 6, 2016.
U.S. Appl. No. 15/173,303, Notice of Allowance dated Nov. 4, 2016.
JP patent application No. 2008-526152, Office Action dated Jun. 25, 2013.

(56) References Cited

OTHER PUBLICATIONS

U.S. Appl. No. 12/484,065, Notice of Allowance dated Oct. 4, 2013.
MX patent application No. 2010/013888, Office Action dated Jul. 22, 2013.
JP patent application No. 2011-513742, Office Action dated Oct. 8, 2013.
JP patent application No. 2011-513742, Notification of Reasons for Rejection dated Feb. 4, 2014.
MX patent application No. 2010/013888, Office Action dated Feb. 20, 2014.
EP patent application No. 09794889.7, Office Action dated Apr. 10, 2014.
U.S. Appl. No. 13/929,653, Notice of Allowance dated Jun. 9, 2014.
JP patent application No. 2006-552102, Office Action dated Jul. 8, 2014.
JP patent application No. 2006-552102, Decision to Grant dated Aug. 25, 2014.
U.S. Appl. No. 13/464,835, Office Action dated Jan. 9, 2015.
U.S. Appl. No. 13/765,522, Office Action dated Apr. 23, 2015.
U.S. Appl. No. 14/449,040, Office Action dated May 19, 2015.
U.S. Appl. No. 13/938,029, Office Action dated Jun. 11, 2015.
U.S. Appl. No. 13/765,522, Notice of Allowance dated Jun. 22, 2015.
U.S. Appl. No. 14/449,040, Notice of Allowance dated Jul. 1, 2015.
U.S. Appl. No. 13/464,835, Notice of Allowance dated Jul. 7, 2015.
JP patent application No. 2014-108250, Notification of Reasons for Rejection dated Jun. 16, 2015.
EP patent application No. 09794889.7, Exam Report dated Aug. 5, 2015.
U.S. Appl. No. 14/815,672, Office Action dated Sep. 22, 2015.
U.S. Appl. No. 14/156,267, Office Action dated Nov. 4, 2015.
U.S. Appl. No. 13/938,029, Notice of Allowance dated Dec. 22, 2015.
U.S. Appl. No. 12/973,779, Office Action dated Dec. 19, 2012.
U.S. Appl. No. 12/973,779, Office Action dated May 31, 2013.
U.S. Appl. No. 12/973,779, Office Action dated Nov. 29, 2013.
U.S. Appl. No. 14/289,502, "Bi-polar protected electrodes and multi-cell stacks," Visco et al., filed May 28, 2014.
U.S. Appl. No. 13/615,351, Office Action dated Mar. 25, 2013.
U.S. Appl. No. 12/484,079, Notice of Allowance dated Apr. 17, 2013.
CA patent application No. 2,542,304, Office Action dated Jan. 30, 2013.
U.S. Appl. No. 13/464,835, Office Action dated May 2, 2013.
U.S. Appl. No. 13/615,351, Notice of Allowance dated May 31, 2013.
U.S. Appl. No. 12/484,065, Office Action dated Jun. 17, 2013.
U.S. Appl. No. 13/464,835, Office Action dated Aug. 29, 2013.
JP patent application No. 2008-526152, Office Action dated Mar. 5, 2013.
CN patent application No. 200980131906.4, Office Action dated Jun. 26, 2013.
WO patent application No. PCT/US2011/030969, International Search Report and Written Opinion dated Jan. 11, 2012.
U.S. Appl. No. 12/484,081, Notice of Allowance dated Jan. 18, 2013.
U.S. Appl. No. 13/464,835, Office Action dated Sep. 25, 2012.
U.S. Appl. No. 13/182,322, Notice of Allowance dated Sep. 19, 2012.
JP patent application No. 2006-552102, Office Action dated Sep. 25, 2012.
KR patent application No. 10-2005-7006382, Notice to Submit Response dated Oct. 30, 2012.
KR patent application No. 10-2006-7007309, Notice of Allowance dated Nov. 23, 2012.
U.S. Appl. No. 13/717,255, "Active Metal Fuel Cells," Visco et al., filed Dec. 17, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
U.S. Appl. No. 13/673,789, Office Action dated Feb. 28, 2013.
U.S. Appl. No. 12/484,063, Office Action dated Feb. 6, 2012.
U.S. Appl. No. 12/484,079, Office Action dated Apr. 27, 2012.
U.S. Appl. No. 12/484,081, Office Action dated Jun. 21, 2012.
U.S. Appl. No. 12/484,063, Office Action dated Aug. 1, 2012.
U.S. Appl. No. 12/484,065, Office Action dated Aug. 9, 2012.
U.S. Appl. No. 12/484,063, Notice of Allowance dated Sep. 14, 2012.
U.S. Appl. No. 13/663,224, "Catholytes for aqueous lithium/air battery cells," Visco et al., filed Oct. 29, 2012.
U.S. Appl. No. 12/484,065, Office Action dated Feb. 19, 2013.
U.S. Appl. No. 12/032,564, Office Action dated Jun. 9, 2011.
U.S. Appl. No. 12/032,564, Office Action dated Aug. 24, 2011.
U.S. Appl. No. 12/032,564, Notice of Allowance dated Sep. 8, 2011.
U.S. Appl. No. 12/607,360, Office Action dated Dec. 13, 2012.
U.S. Appl. No. 12/607,360, Notice of Allowance dated Feb. 8, 2013.
KR patent application No. 9-5-2012-062458790, Notice to Submit Response dated Oct. 19, 2012.
CN patent application No. 200680037611.7, Office Action dated Jun. 4, 2012.
EP patent application No. 03809186.4, Examination Report dated Jun. 21, 2012.
JP patent application No. 2006-535572, Decision to Grant a Patent dated Sep. 4, 2012.
CA patent application No. 2,555,637, Notice of Allowance dated Apr. 17, 2012.
CN patent application No. 200680037611.7, Notification to grant patent right for invention dated Aug. 21, 2012.
JP patent application No. 2008-526152, Notification of reasons for rejection dated Sep. 4, 2012.
JP patent application No. 2008-526152, Notification of reasons for rejection dated Mar. 5, 2013.
CN patent application No. 200980131906.4, First Office Action dated Dec. 4, 2012.
MX patent application No. 2010/013888, First Official Action dated Jan. 25, 2013.
WO patent application No. PCT/US2009/047278, International Search Report and Written Opinion dated Jan. 10, 2010.
U.S. Appl. No. 12/907,819, Notice of Allowance dated Nov. 10, 2011.
U.S. Appl. No. 12/484,079, Office Action dated Nov. 29, 2012.
International Search Report and Written Opinion dated Oct. 18, 2005 from International Application No. PCT/US2004/033372.
De Jonghe et al., "Chemical Protection of a Lithium Surface", PolyPlus Battery Company, U.S. Appl. No. 11/092,781, filed Mar. 28, 2005, pp. 1-34.
U.S. Appl. No. 11/092,781, Office Action dated Jun. 16, 2006.
U.S. Appl. No. 11/092,781, Office Action dated Feb. 1, 2007.
U.S. Appl. No. 11/092,781, Office Action dated Jun. 25, 2007.
U.S. Appl. No. 11/092,781, Office Action dated Feb. 22, 2008.
U.S. Appl. No. 10/686,189, Office Action dated Oct. 12, 2006.
U.S. Appl. No. 10/686,189, Office Action dated Apr. 11, 2007.
U.S. Appl. No. 10/731,771, Office Action dated Sep. 28, 2006.
U.S. Appl. No. 10/731,771, Office Action dated Mar. 16, 2007.
U.S. Appl. No. 10/772,157, Office Action dated Nov. 1, 2007.
U.S. Appl. No. 10/772,157, Office Action dated Feb. 6, 2008.
U.S. Appl. No. 10/772,157, Office Action dated Jul. 11, 2008.
U.S. Appl. No. 10/772,157, Office Action dated Dec. 30, 2008.
U.S. Appl. No. 11/824,548, Office Action dated Mar. 20, 2008.
U.S. Appl. No. 11/824,548, Office Action dated Jan. 26, 2009.
U.S. Appl. No. 10/825,587, Office Action dated Jun. 25, 2007.
U.S. Appl. No. 10/825,587, Office Action dated Apr. 1, 2008.
U.S. Appl. No. 10/825,587, Office Action dated Jun. 5, 2008.
U.S. Appl. No. 10/825,587, Office Action dated Oct. 16, 2008.
U.S. Appl. No. 10/772,228, Office Action dated Sep. 21, 2007.
U.S. Appl. No. 10/772,228, Office Action dated Nov. 28, 2006.
U.S. Appl. No. 10/824,944, Office Action dated Mar. 12, 2007.
U.S. Appl. No. 10/824,944, Office Action dated Sep. 7, 2006.
U.S. Appl. No. 11/245,472, Office Action dated Aug. 23, 2007.
U.S. Appl. No. 11/245,472, Office Action dated Apr. 16, 2008.
U.S. Appl. No. 10/986,441, Office Action dated Oct. 20, 2008.

(56) References Cited

OTHER PUBLICATIONS

U.S. Appl. No. 11/823,847, Office Action dated Sep. 16, 2008.
U.S. Appl. No. 12/649,245, Office Action dated Mar. 31, 2010.
U.S. Appl. No. 10/825,587, Notice of Allowance dated Nov. 24, 2008.
U.S. Appl. No. 10/772,228, Notice of Allowance dated Jan. 22, 2008.
U.S. Appl. No. 11/824,574, Office Action dated Dec. 31, 2008.
China patent application No. 2003801061464, First Office Action dated Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O—Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}(PO_4)_3$, M=Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2 (PO_4)_3$", Solid State Ionics 62 (1993), pp. 309-316.
Aono, et al., "Electrical property and sinterability of $LiTi_2 (PO_4)_3$ mixed with lithium salt ($Li_3PO_4$ or $Li_3BO_3$)", Solid State Ionics 47 (1991) pp. 257-264.
Aono, et al., "Ionic Conductivity of β=$Fe_2 (SO_4)_3$ Type $Li_3Cr_2 (PO_4)_3$ Based Electrolyte", Chemistry Letters, 1993, pp. 2033-2036.
Aono, et al., "Ionic Conductivity of $LiTi_2 (PO_4)_3$ Mixed with Lithium Salts", Chemistry Letters, 1990, pp. 331-334.
Fu, Jie, "Superionic conductivity of glass-ceramics in the system $Li_2O$—$Al_2O_3$—$TiO_3$—$P_2O_5$", Solid State Ionics, 96 (1997), pp. 195-200.
Fu, Jie, "Fast Li+ ion conducting glass-ceramics in the system $Li_2O$—$Al_2O_3$—$GeO_2$—$P_2O_5$" Solid State Ionics 104 (1997), pp. 191-194.
Aono, et al., "DC Conductivity of $Li_{1.3}Al_{0.3}Ti_{1.7}(PO_4)_3$ Ceramic with Li Electrodes", Chemistry Letters, 1991, pp. 1567-1570.
Aono, et al., "Electrical Properties of Sintered Lithium Titanium Phosphate Ceramics $(Li_{1+x}M_xTi_{2-x}PO_4)_3,M^{3+}32 Al^{3+},Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of The Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2$(B) in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, 4th vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, dated Aug. 30, 2007.
CN patent application No. 200480037293.5, Office Action dated Aug. 22, 2008.
EP patent application No. 04794699.1, Examination Report dated Aug. 5, 2008.
AU patent application No. 2003301383, Examination Report dated Sep. 29, 2008.
CN patent application No. 200480042697.3, Office Action dated Feb. 15, 2008.

(56) References Cited

OTHER PUBLICATIONS

U.S. Appl. No. 11/245,472, Office Action dated Jul. 24, 2008.
CN patent application No. 200480042697.3, Office Action dated Dec. 19, 2008.
Thokchom, Joykumar S., et al., *Water Durable Lithium Ion Conducting Composite Membranes from the $Li_2O$—$Al_2O_3$—$TiO_2$—$P_2O_5$ Glass-Ceramic*, Journal of The Electrochemical Society, 154 (4), 2007, pp. A331-A336.
U.S. Appl. No. 11/245,472, Office Action dated Jan. 8, 2009.
U.S. Appl. No. 11/824,579, Office Action dated Jan. 29, 2009.
U.S. Appl. No. 11/823,847, Office Action dated Apr. 28, 2009.
CN patent application No. 200480042697.3, Office Action dated Jun. 5, 2009.
U.S. Appl. No. 11/245,472, Office Action dated Jul. 8, 2009.
AU patent application No. 2004306866, Exam Report dated Apr. 9, 2009.
AU patent application No. 2004316638, Office Action dated Aug. 3, 2009.
U.S. Appl. No. 10/986,441, Notice of Allowance dated Jun. 19, 2009.
U.S. Appl. No. 10/772,157, Notice of Allowance dated Sep. 17, 2009.
International patent application No. PCT/US06/48755, International Search Report dated Apr. 7, 2008.
International patent application No. PCT/US06/48755, Written Opinion dated Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the $42^{nd}$ Power Sources Conference, Jun. 2006, p. 2.14.
Read J., "Electrolyte Formulation and Temperature Performance of the $Li/O_2$ Battery", Proceeding of the $9^{th}$ Electrochemical Power Sources R&D Symposium, Jun. 2005, 15 pages.
EP patent application No. 04794699.1, Notice of Allowance dated Jun. 10, 2009.
U.S. Appl. No. 12/334,116, Office Action dated Oct. 27, 2009.
EP patent application No. 03809186.4, Examination Report dated Nov. 24, 2009.
U.S. Appl. No. 11/824,548, Notice of Allowance dated Dec. 17, 2009.
U.S. Appl. No. 11/245,472, Office Action dated Feb. 4, 2010.
U.S. Appl. No. 12/475,403, Office Action dated Feb. 8, 2010.
AU patent application No. 2003301383, Notice of Acceptance dated Nov. 26, 2009.
CN patent application No. 200480037293.5, Office Action dated Jan. 29, 2010.
EP patent application No. 04794655.3, Examination Report dated Apr. 22, 2010.
CA patent application No. 2,502,438, Examination Report dated May 12, 2010.
U.S. Appl. No. 11/562,883, Office Action dated Jun. 7, 2010.
AU patent application No. 2006280097, Examination Report dated Jun. 9, 2010.
JP patent application No. 2004-545584, Notification of reason for rejection dated Jun. 8, 2010.
U.S. Appl. No. 12/475,403, Office Action dated Jun. 22, 2010.
U.S. Appl. No. 11/824,579, Office Action dated Jun. 25, 2010.
CN patent application No. 200480037293.5, Office Action dated Jun. 24, 2010.
AU patent application No. 2004306866, Notice of Acceptance dated Jun. 17, 2010.
U.S. Appl. No. 12/831,066, "Active Metal Fuel Cells", Visco et al., filed Jul. 6, 2010.
U.S. Appl. No. 12/649,245, Office Action dated Jul. 19, 2010.
U.S. Appl. No. 12/831,066, Office Action dated Aug. 18, 2010.
U.S. Appl. No. 11/824,597, Notice of Allowance dated Sep. 9, 2010.
KR patent application No. 10-2005-7006382, Office Action dated Aug. 31, 2010.
U.S. Appl. No. 12/475,403, Notice of Allowance dated Oct. 7, 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type $Li_5La_3M_2O_{12}$ (M=Nb, Ta)", J. Am. Chem. Soc. 86 (3) 437-40 (2003), Oct. 21, 2002.
U.S. Appl. No. 12/649,245, Office Action dated Nov. 30, 2010.
U.S. Appl. No. 11/612,741, Office Action dated Nov. 29, 2010.
U.S. Appl. No. 11/562,883, Office Action dated Jan. 19, 2011.
U.S. Appl. No. 12/831,066, Office Action dated Jan. 19, 2011.
CA patent application No. 2,542,304, Examination Report dated Apr. 4, 2011.
U.S. Appl. No. 12/831,066, Notice of Allowance dated Apr. 6, 2011.
U.S. Appl. No. 12/907,819, Office Action dated May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report dated May 10, 2011.
KR patent application No. 10-2006-7017692, Notice to Submit Response dated May 13, 2011.
JP patent application No. 2006-535572, Office Action dated Jun. 21, 2011.
JP patent application No. 2006-552102, Office Action dated Jul. 5, 2011.
U.S. Appl. No. 11/612,741, Office Action dated Jul. 22, 2011.
U.S. Appl. No. 12/649,245, Notice of Allowance dated Sep. 14, 2011.
KR patent application No. 2006-7007309, Office Action dated Jul. 27, 2011.
KR patent application No. 2005-7006382, Office Action dated Aug. 10, 2011.
U.S. Appl. No. 13/236,428, Office Action dated Nov. 16, 2011.
U.S. Appl. No. 13/336,459, "Solid State Battery", Visco et al., filed Dec. 23, 2011.
CN patent application No. 200910174918.7, Office Action dated Oct. 19, 2011.
U.S. Appl. No. 11/612,741, Notice of Allowance dated Feb. 3, 2012.
CA patent application No. 2,542,304, Exam Report dated Apr. 3, 2012.
KR patent application No. 9-5-2012-016417008, Office Action dated Mar. 21, 2012.
U.S. Appl. No. 13/236,428, Notice of Allowance dated Apr. 25, 2012.
U.S. Appl. No. 12/888,154, Office Action dated May 3, 2012.
KR patent application No. 10-2005-7006382, Office Action dated Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action dated Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action dated Jul. 5, 2012.
EP patent application No. 03809186.4, Exam Report dated Jun. 21, 2012.
U.S. Appl. No. 13/453,964, Notice of Allowance dated Aug. 14, 2012.
U.S. Appl. No. 12/888,154, Notice of Allowance dated Aug. 20, 2012.
U.S. Appl. No. 11/514,678, Office Action dated Jul. 8, 2010.
U.S. Appl. No. 11/514,678, Office Action dated Feb. 17, 2011.
U.S. Appl. No. 11/514,678, Office Action dated Sep. 22, 2011.
U.S. Appl. No. 11/514,678, Notice of Allowance dated Nov. 24, 2011.
U.S. Appl. No. 11/514,678, Notice of Allowability dated Jan. 24, 2012.
U.S. Appl. No. 11/501,676, Office Action dated Mar. 26, 2010.
U.S. Appl. No. 11/501,676, Notice of Allowance dated Sep. 9, 2010.
U.S. Appl. No. 13/333,886, Office Action dated Sep. 20, 2012.
AU patent application No. 2006280097, Exam Report dated Jun. 9, 2010.

(56) References Cited

OTHER PUBLICATIONS

CN patent application No. 2006800376117, Office Action dated Sep. 25, 2009.
CN patent application No. 2006800376117, Office Action dated May 11, 2011.
CN patent application No. 2006800376117, Office Action dated Jan. 31, 2012.
CN patent application No. 2006800376117, Notification to Grant Patent dated Aug. 21, 2012.
EP patent application No. 06813340, European Search Report dated Feb. 17, 2011.
JP patent application No. JP2008-526152, Office Action dated Sep. 4, 2012.
MX patent application No. MX/a/2008/002074, Office Action dated Apr. 19, 2012.
WO patent application No. PCT/US2006/030985, International Search Report dated Jul. 31, 2007..
WO patent application No. PCT/US2009/034101, International Search Report and Written Opinion dated Aug. 24, 2009.
U.S. Appl. No. 14/289,502, Office Action dated May 13, 2016.
U.S. Appl. No. 14/289,502, Office Action dated Feb. 17, 2017.

\* cited by examiner

WATER ACTIVATED BATTERY SYSTEM HAVING ENHANCED START-UP BEHAVIOR

CROSS-REFERENCE TO RELATED APPLICATIONS

This application claims priority to U.S. Provisional Patent Application No. 61/841,181 filed Jun. 28, 2013, titled OPERABLY BREACHABLE WATER ACTIVATED BATTERY SYSTEM; the disclosure of which are incorporated herein by reference in their entirety and for all purposes.

BACKGROUND OF THE INVENTION

1. Field of the Invention

The present invention relates to alkali metal water-activated battery systems, to methods for making and operating the instant battery systems, and to cathodes and methods for producing a cathode therefor 2. Description of Related Art Global issues are increasing the need for and expanding the role of underwater devices to monitor, survey, and explore oceans, harbors and coastal water systems. Underwater deployments and subsea applications abound. Examples include i) oil and gas companies evaluating the viability of an offshore oil field, or constructing, maintaining and operating offshore rigs, or responding to a catastrophic event (such as an oil spill); ii) sovereign nations conducting surveillance of their harbors and littoral zones, or performing underwater ship inspections or naval reconnaissance; and iii) the oceanographic community observing and collecting data on seismic activity and aquatic ecosystems. Underwater power sources, and in particular batteries, are needed to enable or otherwise support the ever-expanding role of these underwater applications.

Toward that end, prior work by the present applicants has enabled the practicality of alkali metal water-activated batteries, and in particular exceptionally lightweight lithium seawater batteries based on protected lithium electrodes capable of discharging over long periods of time with little or no corrosion. In accordance with applicant's prior work, these lithium seawater batteries have an open cell architecture wherein seawater serves as a conducting electrolyte between a protected lithium anode structure and a cathode open to the seawater environment. In some instances, seawater may also serve as the cathode depolarizer or the cathode may contain a solid phase electroactive material exemplified by transition metal halides, including cuprous chloride, silver chloride, and cuprous thiocyanate.

Non-limiting examples of open cell architecture lithium seawater batteries having a protected lithium electrode are described in Assignee's copending U.S. Patent Application Publication No.: 20110269007 to Visco et al., and Assignee's US patents, specifically U.S. Pat. Nos. 7,645,543; 7,824,806; and U.S. Pat. No. 7,282,295 to Visco et al., the entire disclosures of which are hereby incorporated by reference in their entirety. Moreover, the protected lithium electrodes, which provide a key component of said lithium seawater battery cells, are fully described in U.S. Pat. Nos. 7,645,543; 7,390,591; 7,824,806; 7,282,295, and U.S. Pat. No. 8,129,052 to Visco et al., which are also hereby incorporated by reference in their entirety.

SUMMARY OF THE INVENTION

In accordance with the instant invention, lithium seawater battery technology is further advanced by the development of techniques for enhancing startup behavior and extending discharge time in a seawater environment.

In various aspects the present invention provides a water-activated battery cell and battery system adapted to operate in and/or on the surface of a natural or manmade waterbody, including oceans, rivers, bays, dams and ports.

In one aspect the invention provides a water-activated battery cell with enhanced startup behavior. In particular, the battery cell includes what is termed herein as a startup-enhancing component material, which, activated in the presence of water, rapidly reduces internal cell resistance by an amount sufficient to enable the cell to deliver the requisite power to the device for which it is intended to operate. Notably, in various of the aforesaid embodiments, the cell/system would be non-operational if not for the incorporation of the startup component material. By non-operational it is meant a cell that is unable to deliver the requisite power or provide the requisite voltage under load, and typically refers to a cell which when placed under current in support of the device polarizes substantially immediately (e.g., within 10 seconds, within 20 seconds, within 30 seconds, or within 60 seconds).

Startup behavior of a water activated battery cell can depend on a number of external variables including the delivery platform, the temperature at which the cell is stored prior to deployment into the waterbody, and the temperature and salinity of the waterbody itself. Moreover, certain use applications may require a demanding high power startup substantially immediately upon impact with, or submergence into, the waterbody. For instance, in embodiments the battery cell is required to start providing a high power output within a certain timeframe after contacting the waterbody (startup timeframe), including a 10 second startup timeframe, a 30 second startup timeframe, a 60 second startup timeframe, a 100 second startup timeframe, a 200 second startup timeframe, and a 300 second startup timeframe. For example, the amount of start-up enhancing material should be sufficient and its configuration in the cell suitable for reducing the internal cell resistance by an amount sufficient to make the cell operational within the stated timeframe (e.g., a 10 or 60 second startup timeframe).

In accordance with this aspect of the invention, in various embodiments the startup-enhancing component is a thermal agent material or combination of materials activated by water to evolve heat, and by this expedient utilized to reduce cell component resistances by raising the respective component temperatures. In accordance with this aspect of the invention, the amount of thermal agent incorporated in the cell is sufficient to evolve ample heat for the intended purpose of reducing component resistances, and ultimately enabling the cell to deliver the requisite power to the intended device (i.e., making the cell operational).

The thermal agent provides particular utility in use applications whereby: i) startup power is required substantially immediately upon deployment in the waterbody (e.g., the startup timeframe is 10 to 300 seconds); ii) the battery cell is exposed to or stored at cold or even freezing temperatures prior to deployment; and iii) the waterbody temperature is insufficient to raise the cell component temperatures to their operational values within the specified startup timeframe (i.e., typically 10 to 300 seconds).

Accordingly, in various embodiments the thermal agent component is present nearby the cell components and in sufficient amount such that the components, and preferably the seawater serving as electrolyte between the anode structure and cathode, reach their operational temperature within the startup timeframe. By use of the term operational temperature it is meant the temperature at which the respective cell component has a satisfactory internal resistance based on the requisite power requirement. For instance, in various embodiments the thermal agent is present in an amount sufficient to generate at least 1 J/cm² (based on the anode active area, and in particular embodiments the area of the substantially impervious lithium ion conducting ceramic membrane) or at least 2 J/cm², or at least 4 J/cm², or at least 5 J/cm², or at least 10 J/cm².

In certain embodiments the amount of thermal agent component present in the battery system is sufficient, and the agent suitably positioned, to raise the temperature of the ceramic membrane by at least 10° C., at least 15° C., at least 20° C., at least 30° C. or at least 40° C. within a certain time period starting from thermal agent activation, which in embodiments refers to exposure or direct contact with the waterbody liquid, and in some embodiments refers to exposure to ambient moisture above the waterbody. For instance the cell is rendered operable within 10 seconds of thermal agent activation or within 20 seconds, 30 seconds, 60 seconds, 100 seconds, 200 seconds or 300 seconds.

For some use applications the battery system may be required to provide an initial transitory high power output that is beyond its capability at moderate or even room temperature. Accordingly, in certain embodiments the amount of thermal agent present in the battery system is ample to raise the temperature of the battery cell components by an amount sufficient to support the transitory high power output. For instance, the amount of thermal agent is sufficient to boost the conductivity of the membrane by at least twofold relative to its steady state conductivity as measured with respect to the temperature of the waterbody, and for certain embodiments the amount of thermal agent enhances the transitory conductivity of the membrane by at least threefold, or at least fourfold, or even at least tenfold.

In accordance with the invention, the instant battery system is composed of one or more battery cells each having a lithium anode protected from contact with seawater by a substantially impervious, lithium ion-conducting, layer (typically a lithium ion conducting, fully dense, ceramic membrane).

In various embodiments the battery system comprises one or more battery cells disposed in an operably breachably enclosure configured to effect cell activation and thermal agent activation (when present) by breach upon deployment of the system into or onto a waterbody.

In another aspect the invention provides a battery system including one or more battery cells disposed in a functional hermetic enclosure. In various embodiments the battery system includes an operably breachable hermetic enclosure wherein the battery cells and, in embodiments, a water or moisture sensitive thermal agent component is disposed. In another aspect the invention provides a water-activated battery system having improved long term discharge performance in a seawater environment, the improvement effected by the use of a novel, re-sealable, operably breachable hermetic enclosure that mitigates sludge build-up nearby the electrodes.

In concordance with this aspect of the invention, in various embodiments the instant battery system comprises:
 i) an operably breachable hermetic enclosure; and
 ii) at least one lithium battery cell having an open cathode architecture, the lithium cell disposed inside the hermetic enclosure and therein maintained in an open ionic circuit condition (i.e., an inactive state) throughout battery system storage; and iii) optionally, a thermal agent disposed inside the hermetic enclosure for the purpose of warming up one or more battery cell components, the agent typically water activated, which is to mean that it (the thermal agent) evolves heat by reacting with water.

By use of the term "operably breachable hermetic enclosure" it is meant a functional enclosure that: i) protects interior battery system components from exposure to the outside environment during battery storage, and, in particular, protects cathode solid phase electroactive material (when present) and/or the thermal agent (when present) against contact with ambient water; and ii) undergoes an operable breach as a result of deploying the battery system into/onto the waterbody (e.g., seawater). Operable breach activates the battery cell(s) for operation by allowing seawater to enter the enclosure and be used, therein, as an electrolyte for closing the ionic circuit of the cell, thereby perfecting ionic communication between the anode and cathode electrodes. For instance, the battery system configured such that operable breach leads to waterbody liquid filling a spatial gap between anode and cathode electrodes hitherto devoid of an electrolytic medium.

In one aspect the present invention provides a water-activated battery system with improved cold start performance. With regard to this aspect, the instant battery system incorporates what is termed herein a thermal agent component that reacts upon operable breach to evolve a copious amount of heat, and by this expedient improves cold start performance by reducing cell impedance (i.e., internal cell resistance). The instant battery system is particularly beneficial and in some instances enabling for applications whereby a device apparatus, such as a battery powered sonobuoy, requires a significant amount of instantaneous power almost immediately upon deployment in a waterbody (e.g., within 10 seconds), but the battery system, as a result of being stored or transported at a cold temperature, has a prohibitively high internal cell resistance and therefore must be heated to reduce the impedance of certain cell components to values which are commensurate with the sonobuoy power requirement.

In another aspect the present invention provides a water-activated battery system that mitigates sludge build-up by confining the amount of waterbody liquid available to interact with discharge product produced at the cathode. By this expedient the instant battery system exhibits improved discharge performance in a seawater environment, and especially long term underwater discharge, such as over a period of 24 hours or longer (e.g., 2 days, about a week, about a month, about a year). With regard to this aspect, the operably breachable hermetic enclosure is configured to be re-sealable after the operable breach has taken place and the ensuant influx of seawater sufficient for the intended operation.

In accordance with the instant invention, the battery system includes at least one lithium battery cell having, what is termed herein, an open-cathode architecture. By use of the term "open-cathode architecture" when referring to the battery cell(s) it is meant that at least the cathode is directly exposed to the interior environment inside the hermetic enclosure, and that upon operable breach the cathode is exposed to waterbody liquid. In various embodiments the battery system incorporates more than one lithium battery cell configured with an open-cathode architecture; for instance, 2, 3, 4 or more of such said cells. The cells may be electrically connected in series, parallel or a combination thereof. Moreover, a variety of cell configurations are contemplated and disclosed herein, including cells composed of various combinations of double-sided or single-sided protected lithium anode structures and open-cathode structures, as well as bipolar electrodes composed of a protected anode and an open cathode sharing a common current collector.

As it pertains to the individual battery cells, the open-cathode structure is configured to receive waterbody liquid, which ultimately serves as a liquid electrolyte in contact with the cathode. The cathode structure may include an electron transfer medium for electro-reducing seawater (e.g., water itself may serve as depolarizer or oxygen dissolved in the seawater or both). In other embodiments the cathode contains a solid-phase electroactive material such as a transition metal halide or the like, and it is this solid-phase electroactive material that is electro-reduced during cell discharge; thus, in such embodiments seawater serves only as an electrolytic medium and not a depolarizer. It is also contemplated that the open-cathode may operate as a hybrid construct, with discharge capacity derived from both seawater and solid phase electroactive material. Various open cathode structures which are suitable for use herein as a cathode structure are described in U.S. Patent Application Publication No.: 20110269007 to Visco et al., and Assignee's US patents, specifically U.S. Pat. Nos. 7,645,543; 7,824,806; 7,282,295 to Visco et al., which have already been incorporated by reference.

The anode structure is typically a protected lithium anode structure and contains a solid phase lithium electroactive material element and a protective membrane material element configured to protect the lithium electroactive material from contact with the waterbody liquid electrolyte. As described above protected lithium anode structures, as they are referred to herein and elsewhere have been described in detail in U.S. Pat. Nos. 7,645,543; 7,390,591; 7,824,806; 7,282,295 to Visco et al., all of which have already been incorporated by reference herein. The protective membrane prevents waterbody liquid from touching the lithium metal, but allows lithium ions to move across the protective membrane and into the waterbody liquid during cell discharge.

The operably breachable hermetic enclosure has at least dual functionality in that it: i) protects the battery system components, and in particular the solid phase electroactive cathode material and/or the thermal agent (when present), from exposure to ambient conditions during storage and transport; and ii) as a result of deployment undergoes an operable breach that activates the battery system for operation by allowing entry of waterbody liquid. In certain embodiments the enclosure has triple functionality in that it reseals after deployment, thereby confining the amount of waterbody liquid capable of interacting with the battery cells, and by this expedient mitigates sludge build-up nearby the electrodes.

Operable breach is triggered by or as a result of battery system deployment. In various embodiments operable breach may be effected mechanically (i.e., relating to a physical force) or chemically. Moreover, it (operable breach) may take place at various times over the course of deployment. For instance, operable breach may take place upon battery system impact with the waterbody (e.g., when deployed from an aircraft), or at some time prior thereto, (e.g., when falling midstream through the air toward the waterbody) or at some time after impact (e.g., the breach is caused to take place some time after the battery has already been immersed in the waterbody).

In various embodiments the hermetic enclosure comprises a container having a first opening for receiving waterbody liquid and a first operably breachable seal assembly hermetically configured to the first opening. In embodiments the container further comprises a second opening and a second operably breachable seal assembly configured to hermetically seal the second opening. In embodiments the first and second openings are positioned on opposing container sidewalls.

The container sidewalls are generally impermeable to waterbody liquid and preferably ambient moisture as well. Optionally, the sidewalls may further provide mechanical structure for ease of handling or for supporting internal components. In various embodiments a portion of the container sidewalls are rigid, such as a rigid skeleton suitable for supporting thermal insulation, while other portions of the container sidewalls may be flexible and preferably lightweight.

In various embodiments the first seal assembly comprises an inlet port and an operably breachable barrier element. In some embodiments the operable breach of the barrier element is activated mechanically. For instance the barrier element is caused to undergo rupture upon deployment of the battery system into/onto the waterbody. In various embodiments the seal assembly is impact activated.

In various embodiments the seal assembly comprises a rupture actuator for engagingly rupturing the barrier element upon impact of the battery system with the waterbody; for instance, the rupture element a ball bearing or the like.

In various embodiments, operable breach of the barrier element is activated chemically (e.g., via dissolution).

In various embodiments the seal assembly is configured for transforming the battery system, post operable breach, from an open architecture to a substantially closed architecture. In embodiments thereof the seal assembly may further comprise an obstruction component that interacts with incoming water to mitigate the continuance of water flow through the port receptacle. For instance, the obstruction component may be a water expandable member configured to re-seal the port receptacle post operable breach, such as a water foaming or gelling polymer.

In various embodiments the battery system further comprises a discrete thermal agent for generating heat upon operable breach, the thermal agent suitably disposed in the interior of the enclosure and present in sufficient amount such that upon operable breach one or more constituents of the external environment reacts with the thermal agent to produce an amount of heat sufficient to reduce the internal resistance of the cell components by an amount necessary for the cell(s) to deliver the requisite electrical power to the device for which it (the battery system) is intended to power. Moreover, in various embodiments, absent the thermal agent, the battery cell(s) are unable to provide the requisite power output.

In accordance with the invention, the thermal agent is not an electroactive material of the one or more battery cells and is not configured as such, and thus is not electro-reduced or electro-oxidized as a result of cell operation and thus does not directly provide ampere-hour capacity to the cell(s). Moreover, the amount and placement of the thermal agent is sufficient and suitable for the cell(s) to deliver the requisite electrical power to the device for which it (the battery system) is intended to power. In some embodiments that time period is within 10 to 60 seconds of operable breach (e.g., within 10 seconds). In some embodiments it is within 10 seconds of contacting the waterbody.

In various embodiments the heat evolving reaction between the thermal agent and the external constituent (e.g., ambient moisture or waterbody liquid) is dissociative dissolution of the thermal agent. In other embodiments the heat evolving reaction is hydration and hydrolysis of the thermal agent in contact with the constituent(s) of the external environment. In yet other embodiments the heat evolving reaction is corrosion. And in yet other embodiments the heat evolving reaction is oxidation or reduction of the thermal agent.

In various embodiments the heat generated by the reaction of the thermal agent with the external environment constituent(s) is greater than 1 $J/cm^2$ of membrane area, in some embodiments greater than 2 $J/cm^2$ of membrane area, and yet in other embodiments greater than 3 $J/cm^2$ of membrane area or greater than 4 or 5 $J/cm^2$ of membrane area; for instance, between 5-30 $J/cm^2$ of membrane area. By membrane it is meant the substantially impervious layer.

In various embodiments the external environment constituent reacting with the thermal agent is waterbody liquid or ambient moisture from the air above the water or some combination thereof.

In various embodiments the amount of heat generated as a result of the reaction is sufficient for the battery cell to deliver a power output of at least 10 W per kilogram based on the weight of the substantially impervious layer of the protective membrane (e.g., the ceramic layer), and may be at least 100 W/kg and in some embodiments at least 1000 W/kg of said impervious ceramic layer.

In some embodiments the thermal agent is disposed in a discrete substantially hermetic secondary container held within the confines of the operably breachable enclosure.

In various embodiments the thermal agent is in the form of a powder compact. In some embodiments the thermal agent is disposed in direct contact with the cathode structure, and when porous, may be disposed within pores of the cathode structure. In some embodiments the thermal agent is disposed in a gap between the cathode and anode structures, the agent nearby the protective membrane (e.g., nearby or in contact with the impervious ceramic layer). In embodiments the thermal agent is disposed both in the gap between electrodes and in the cathode pore structure. In some embodiments the thermal agent is disposed on the interior walls of the hermetic enclosure, and in particular the container thereof.

In other aspects the invention provides methods of making and operating a battery system.

DETAILED DESCRIPTION OF SPECIFIC EMBODIMENTS

Figure 1:
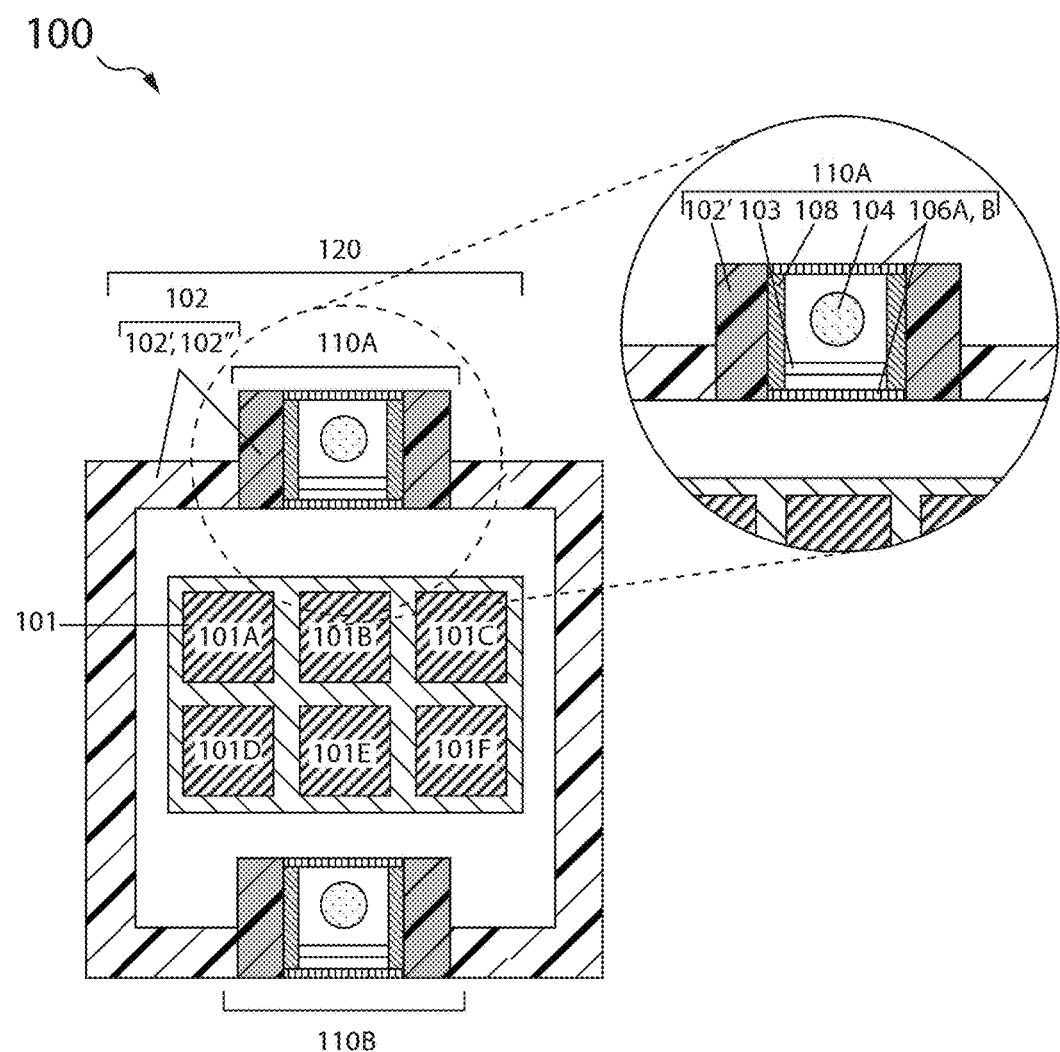
FIG. 1 is a schematic illustration of a battery system in accordance with an embodiment of the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

In one aspect the present invention provides a water-activated battery cell comprising a protected anode structure, a cathode structure and thermal agent component for heating up the cell components, and which is activated by the presence of water, and in various embodiments by contact with waterbody liquid. The thermal agent present in sufficient amount to provide a performance enhancement or to render the cell operable for startup within a designated timeframe, typically less than 300 seconds from thermal agent activation.

In another aspect the present invention provides a water-activated battery system that is adapted to operate in and/or on the surface of a waterbody (i.e., a body of water including those which are natural or man made). These include oceans, rivers, bays, dams and ports.

The battery system comprises:
ii) an operably breachable hermetic enclosure; and iv) at least one lithium battery cell having an open cathode architecture, the lithium cell disposed inside the hermetic enclosure and therein maintained in an open ionic circuit condition (i.e., an inactive state) throughout battery system storage; and v) optionally, a thermal agent disposed inside the hermetic enclosure for the purpose of warming up one or more battery cell components, the agent typically water activated, which is to mean that it (the thermal agent) evolves heat by reacting with water.

By use of the term "operably breachable hermetic enclosure" it is meant a functional enclosure that: i) protects interior battery system components from exposure to the outside environment during battery storage, and, in particular, protects cathode solid phase electroactive material (when present) and/or the thermal agent (when present) against contact with ambient water; and ii) undergoes an operable breach as a result of deploying the battery system into/onto the waterbody. The operable breach leads to waterbody liquid (e.g., seawater) entering the enclosure, and this in turn activates the battery cell(s) for operation and the thermal agent(s) when present. Specifically, as it pertains to battery activation, the seawater entering the enclosure serves as an electrolyte to close the ionic circuit of the cell by perfecting ionic communication between the anode and cathode electrodes. For instance, the battery system configured such that operable breach leads to waterbody liquid filling a spatial gap between anode and cathode electrodes that was hitherto devoid of electrolyte.

By use of the term "open cathode architecture" when referring to the battery cell(s) it is meant that at least the cathode is directly exposed to the interior environment inside the hermetic enclosure.

Operable breach is triggered by or as a result of battery system deployment. In various embodiments operable breach may be effected mechanically (i.e., relating to a physical force) or chemically. Moreover, it (operable breach) may take place at various times over the course of deployment. For instance, operable breach may take place upon battery system impact with the waterbody (e.g., when deployed from an aircraft), or at some time prior thereto, (e.g., when falling midstream through the air toward the waterbody) or at some time after impact (e.g., the breach is caused to take place some time after the battery has already been immersed in the waterbody).

To realize operable breach, the hermetic enclosure includes at least one 'operably breachable seal assembly' (or more simply 'seal assembly') configured to an hermetic container, with the seal assembly providing an interface to the external environment via an inlet port present on the container sidewall.

In various embodiments the seal assembly includes at least a barrier element, which is that component of the assembly which provides a barrier to water permeation during storage and which undergoes operable breach to allow the influx of waterbody liquid into the enclosure. A variety of seal assemblies are contemplated for use herein, and may be categorized based on the manner by which the barrier element is compromised to effect operable breach, including, as mentioned above, mechanically and chemically (e.g., the barrier element a diaphragm that mechanically ruptures or chemically decomposes by reaction with water, or mechanically disengages from the seal assembly).

In various embodiments operable breach of the seal assembly is triggered mechanically, or more particularly is "impact-triggered," as a result of the seal system absorbing kinetic energy released when the battery impacts the waterbody on deployment (e.g., the battery system dropped into the ocean from an aircraft or watercraft). Accordingly, in various embodiments the battery system, and specifically the hermetic enclosure, includes at least one, but typically two or more, mechanically breachable seal assemblies that operably breach in response to inertia associated with deployment, and, more specifically, seal breach is triggered by the impact between the battery system and the waterbody (i.e., it is impact-triggered). For instance, in various embodiments, the battery system may be deployed from a significant distance above the waterbody (e.g., launched or dropped from an aircraft or the side of a watercraft) and the mechanical seal assembly is configured such that the kinetic energy associated with the impact is sufficiently harnessed to effect breach.

In various embodiments an impact-triggered operably breachable seal assembly includes a diaphragm-like barrier element and a rupture actuator that engages the diaphragm on impact, causing it (the barrier element) to rupture (e.g., break, puncture, shatter). In certain embodiments the rupture actuator breaks or shatters a brittle rigid diaphragm, and in other embodiments it punctures or pierces a non-brittle diaphragm (i.e., a flexible diaphragm). In various embodiments the rupture actuator is an unrestrained free floating and discrete solid body element (i.e., a free floating rupture element) and the seal assembly suitably adapted for impact-triggering such that the free floating solid body rupture element engagingly ruptures the diaphragm. In other embodiments the seal assembly is adapted to include a punch-like rupture element partially constrained to move in a substantially linear motion for engagingly puncturing a non-brittle diaphragm on operable impact. When using the term 'impact' or 'operable impact' it is meant to refer to battery deployment and specifically the impact between the battery system and the waterbody.

In various embodiments the hermetic enclosure is adapted to include an impact triggered, operably breachable, differential pressure seal assembly having a barrier element (e.g., an end-plate) that is pressure sealed via a gasket to a mating surface of the enclosure (or the end-plate itself may have or serve as an integral gasket). The differential pressure is generated by a positive or negative internal pressure within the hermetic enclosure (e.g., a positive pressure seal), and the endplate disengages from the seal assembly on operable breach whence the gasket seal is disrupted on impact with the waterbody.

In alternative embodiments operable breach is not impact triggered. Accordingly, in various embodiments operable breach may be triggered prior to impact (e.g., midstream as the battery system falls toward the waterbody). For instance, the hermetic enclosure has a tug triggered seal assembly as described in more detail below. Or, in other embodiments, the seal assembly is triggered to breach after impact. For instance, the seal assembly including a barrier element in the form of a membrane layer that decomposes by reacting with the waterbody over time (e.g., dissolving therein).

For certain use applications it is desirable to minimize the "time lag" between operable breach of the battery and device startup. Accordingly, the present invention contemplates hermetic enclosures and cells that are configured for rapid intake of waterbody liquid and/or are constructed to expedite wetting and/or warming of battery cell components. For example, the cells may incorporate a "wicking agent" or a thermal agent in the spatial gap between anode and cathode electrodes for the purpose of facilitating ingress of waterbody liquid therebetween or for heating one more battery cell components.

Time lag between operable breach and device startup may be significantly affected by storage conditions prior to deployment, the manner by which the battery is deployed, and/or the conditions of the waterbody in which the battery is caused to operate. Specifically, temperature may have a strong effect on lag time, particularly cold temperature environments and/or conditions of deployment that can lead to battery components reaching temperatures that can retard electrochemical kinetics (e.g., 10° C. or less), especially kinetics at the electrode/electrolyte interfaces. Undue lag time may be exacerbated by the method of deployment and/or storage conditions prior to deployment, especially if the hermetic enclosure and/or battery components reach a temperature below 0° C., in which event the waterbody liquid may freeze and therewith block further intake of water and/or result in ice forming on or nearby the electrodes. Moreover, residual moisture present in the enclosure during storage and prior to operable breach may lead to frosting of cell components if the battery is exposed for sufficient time to freezing temperatures. Thus, in various embodiments the moisture content within the interior of the enclosure is preferably kept to a value below which internal frosting is not effectuated during storage and/or deployment, and in embodiments is preferably less than 100 ppm, more preferably less than 50 ppm and even more preferably less than 10 ppm.

Considering the aforesaid adverse effect which cold temperature (i.e., temperature below 10° C.) may have on performance of the instant battery, and in particular for applications that require device startup substantially immediately upon deployment (i.e., once the system is immersed in/on the waterbody), and/or applications whereby cold component temperatures can result in prohibitively long lag times, another aspect of the present invention relates to the use of a water-activated thermal agent, which, when placed in contact with water, evolves heat for the purpose of warming battery components and/or warming the waterbody liquid in contact with the electrodes. Accordingly, in various embodiments, the instant battery includes a water-activated thermal agent disposed inside the hermetic battery enclosure and therein typically positioned nearby the one or more battery cells, and in particular positioned nearby one or more electrode(s) and in some embodiments the thermal agent is disposed within the pores of the cathode structure and/or in the spatial gap between electrodes. Thus, in various embodiments, operable breach effectuates both battery activation and thermal agent activation. Accordingly, in various embodiments, the battery may be configured to have a minimal lag time between operable breach and device startup, and preferably a lag time of less than 60 seconds, even more preferably less than 30 seconds and even more preferably less than 15 seconds. Moreover, in various embodiments the battery is configured to achieve the aforementioned minimal lag times even though the battery has been stored and/or deployed under conditions that cause one or both of the battery cell electrodes (i.e., cathode, anode or both) and/or the hermetic enclosure to be at a temperature that is less than 10° C. just prior to operable breach. For instance the battery may be stored for a sufficiently long time at cold temperature or deployed in such a manner that the electrode temperature is less 10° C., and yet, notwithstanding these conditions, the lag time between operable breach and device startup is less than 60 seconds by virtue, in part, of the heat evolved from the reaction between the thermal agent and the waterbody liquid, and even more preferably the lag time is less than 30 seconds and even more preferably less than 15 seconds. Accordingly, in various embodiments, substantially immediately prior to operable breach one or more of the battery enclosure and/or a battery cell electrode reaches a temperature of less than 10° C. and the lag time between operable breach and device startup is less than 60 seconds, preferably less than 30 seconds and even more preferably less than 15 seconds.

In various embodiments the operably breachable hermetic enclosure is a battery enclosure in which the anode and cathode electrodes of the battery cell(s) are disposed and therein protected from contact with external ambient water over the course of battery storage and up until operable breach is triggered. Whence breached, water-body liquid penetrates the enclosure, ultimately enabling (i.e., activating) battery operation by creating a contiguous ionic pathway between respective anode and cathode of a given cell and which, said pathway, is sufficient to support the electrical current necessary to power the intended device (e.g., a sonobuoy). By use of the term activation with reference to the battery system or a battery cell thereof it is meant operational enablement effected by the contiguous ionic pathway completed by the waterbody liquid, it is not, however, meant to imply that the battery system actively starts passing electrical current upon activation, albeit for certain use applications this is desired and embodiments are disclosed herein, especially those which require minimal lag time between operable breach and device startup. For instance, in other embodiments, the system may include an electronic timer switch that, post activation, maintains the battery system in an open circuit condition for a certain prescribed time period (i.e., there is an intentional postponement from the time at which the battery system is ready for delivering power and the actual delivery of electrical power to the device). However, in other embodiments, the battery system is configured to deliver sufficient electrical power to operate the intended device substantially immediately upon activation or shortly thereafter, and preferably with minimal "time lag" between operable breach and activation and/or with minimal time lag between operable breach and the time at which it (the battery system) delivers sufficient power to operate the device (referred to more simply herein as device startup) and/or with minimal time lag between activation and device startup. The extent of time lag may depend on waterbody properties (e.g., temperature) as well as the temperature of the battery immediately prior to operable breach, which may itself depend on deployment strategy and the physical conditions pertaining to storage and/or deployment. In accordance with various embodiments of the present invention, the potentiality of a prohibitive time lag may be countered by modifying the battery cell configuration (e.g., the spatial gap between electrodes and cathode pore structure), or the architecture of the hermetic enclosure (specifically the breachable portion thereof), or the battery cell arrangement relative to the enclosure itself. In various embodiments, time lag may be reduced by the incorporation of a functional agent within the interior of the hermetic enclosure, and these may include thermal agents that generate heat upon operable breach and by this expedient may facilitate post activation power delivery to the intended device and/or wetting agents for facilitating activation upon operable breach, and in particular the creation of an ionic pathway between electrodes that is sufficient to support the electrical current to power the device. For instance, a wetting agent component may be incorporated in the spatial gap between anode and cathode electrodes to promote entry of waterbody liquid therebetween, and/or a water activated thermal agent material may be incorporated nearby the cells or decorated about the interior of the enclosure, or nearby an electrode, to raise the temperature of the waterbody liquid and/or that of a battery cell component (e.g., an electrode), and by this expedient mitigate time lag associated with cold temperature storage and/or deployment conditions and/or cold waterbody temperatures. Accordingly, in various embodiments, the present invention provides a battery system that operates with minimal lag time (preferably less than 60 seconds) between operable breach and device startup, and in particular embodiments thereof the temperature of the battery system prior to operable breach is below 10° C., or below 0° C., or below −10° C., or below-20° C.

In accordance with one aspect of the invention, the interior of the hermetic enclosure is isolated from the external environment until operable breach is triggered. Moreover, in various embodiments, during battery system storage and prior to breach thereof, the interior environment within the enclosure and the exterior environment about the enclosure are substantially different. For instance, in some embodiments the interior environment is substantially devoid of water vapor; for example, the interior gas may be dry air, or dry nitrogen or some combination of those or other dry gases. For instance, when a dry environment is desirable, the moisture content of the interior environment is preferably less than 1000 ppm, more preferably less than 100 ppm, even more preferably less than 50 ppm, and yet even more preferably less than 25 ppm. A lightweight battery system may be desirable for various use applications, and especially for remote deployment strategies. Accordingly, in various embodiments, to achieve a lightweight solution, the interior of the hermetic battery enclosure is entirely devoid of liquid in contact with the cathode electrode, and more generally is devoid of liquid other than that possibly incorporated within the confines of a protected anode architecture, and in some embodiments, when the protected anode is itself devoid of liquid, the interior of the battery enclosure is entirely devoid of liquids. In other embodiments, however, it is contemplated that the enclosure may contain some amount of a liquid that is stable in contact with the cathode and compatible with the waterbody liquid in which the battery system is operated.

In accordance with various embodiments there is illustrated in FIG. 1 a water activated battery system 100 intended for operation in or on the surface of a waterbody (e.g., a natural waterbody such as an ocean). The battery 100 includes one or more open cathode architecture battery cells 101A-F disposed inside an operably breachable hermetic battery enclosure 120. For instance, six cells are shown for illustrative purposes. The hermetic enclosure 120 protects the interior battery components (e.g., the cells) from contacting ambient water during battery storage, but upon deployment in the waterbody, or sometime thereafter, the enclosure operably breaches to allow ingress of ocean water therein.

Continuing with reference to FIG. 1, the hermetic battery enclosure 120 includes a container 102 having a first and second opening on opposing container sidewalls, and a first and second breachable seal assembly 110A/B configured for hermetically sealing off the container openings.

Container 102 is impermeable to water and may provide, in some embodiments, mechanical structure for supporting interior battery system components, and/or thermal insulation of significant R-value. The container itself is not operably breachable. Moreover, the container walls are preferably constructed to remain impermeable to ambient water throughout battery storage, deployment and operation.

The container may be rigid, flexible or some combination thereof. Flexible container materials include, but are not limited to, plastics (e.g., thermoplastic polymers such as polyethylene, polypropylene, acrylic, polyvinyl chloride, polystyrene and nylon), plastic/metal laminates (e.g., laminates having a metal foil inner layer as a permeation barrier and mechanically/chemically tough thermoplastic outer layers), and metals (e.g., metal sheets of aluminum, steel, and titanium). When flexible, the container wall or wall portion should be sufficiently thick to provide a moisture barrier and structural integrity against, for example, incidental puncture and/or tearing, but not so thick as to add undue weight to the battery system or inflexibility. As will be recognized by those of skill in the packaging arts, flexible multilayer plastic/metal laminates are known in the packaging arts which are desirably lightweight and can provide both mechanical strength and excellent water permeation barrier properties. A rigid container, or rigid container wall portion, may be made from metal, plastic, glass, ceramic or a material composite thereof or some combination of said materials. For example, thermosetting plastics (e.g., polyurethanes, phenol-formaldehyde resins, epoxies, polyimides and vulcanized rubber) or the aforementioned thermoplastics are also attractive rigid container materials due to their lightweight and suitable material barrier properties in combination with cost effective manufacture. Rigid containers have the advantage of being mechanically robust and thus suitable for supporting interior battery components. In various embodiments the container is constructed of both flexible and rigid materials. For instance, the container may have a rigid interior skeleton (e.g., a rigid plastic) and peripheral walls or wall portions made of flexible sheet (e.g., the aforesaid multilayer laminate), the flexible wall portions advantageously lightweight and the rigid skeleton yielding structural integrity as well as a means to support thermally insulating materials such as Styrofoam. For example, in a particular embodiment, the container has a polymeric based rigid skeleton (e.g., a thermoset polymer), peripheral walls of a multilayer laminate, and optionally a material component of sufficient R-value, such as Styrofoam sheet, for thermal insulation.

Continuing with reference to FIG. 1, the hermetic enclosure includes a first and second operably breachable seal assembly 110A/110B configured in conjunction with the container openings for controlling waterbody flow there through. Seal assembly 110A/110B are substantially identical, so a description of one assembly will, therefore, suffice for description of the other.

Seal assembly 110A (or more simply seal 110A) has an inlet port 102 (also referred to herein as a port receptable) and an operably breachable barrier element 103. As illustrated and described in more detail below, the inlet port may be defined in whole or in part by that portion of the container wall which defines the container opening, and the barrier element is configured to hermetically seal off the inlet port during battery storage, but allow for the admission of waterbody liquid upon operable breach.

In various embodiments the inlet port may take on a number of non-limiting constructions. For instance, as shown in FIG. 1, the inlet port may be contiguously integral with the container sidewall; for example, the container sidewall and inlet port of a single molded construct, such as a molded thermoset (e.g., Bakelite). More particularly, as shown in FIG. 1, inlet port 102 may be a protruding wall portion integral with the container sidewall and which defines the container opening. Alternatively, the container opening may be adapted to fit a discrete inlet port component such as a cylindrically hollow sleeve or the discrete port component may be a raised hollow flange matted to the surrounding surface about the opening in the container sidewall.

A variety of novel breachable seal assemblies are contemplated for use herein, and may be categorized based on the manner by which the barrier element is compromised to effect operable breach, including mechanically and chemically (e.g., breaking it by rupturing or decomposing it by reacting away).

In various embodiments operable breach of the seal assembly is mechanically activated, or more particularly "impact activated," which is to mean that the barrier element is caused to rupture by absorbing kinetic energy released when the battery impacts the waterbody on deployment (e.g., when the battery system is dropped into the ocean from an aircraft or ship). Accordingly, in various embodiments, the hermetic enclosure has, what is termed herein, a rupture seal assembly that includes a rupture actuator for engagingly rupturing the barrier element on impact. In other embodiments the breach may be mechanically activated without the use of a discrete rupture actuator. For instance, a positive or negative pressure seal assembly may be utilized (e.g., a positive pressure seal), which, advantageously, eliminates the need for a dynamic actuator. In other embodiments the seal assembly is breached chemically (e.g., the barrier element a membrane layer formulated to dissolve in contact with waterbody liquid or react away).

Continuing with reference to the battery system illustrated in FIG. 1, the rupture seal assembly 110 has an inlet port 102 integral of the wall portion defining the container opening, a barrier element 103 in the form of a diaphragm, a rupture actuator 104 in the form of an unrestrained free floating and discrete solid body rupture element (e.g., free floating ball bearing), and a pair of porous end-caps 106A/106B (e.g., a mesh screen) configured to define, in part, a seal compartment within the interior of the inlet port, and in which the barrier element and solid body rupture element are disposed and contained. The volume of the seal compartment is generally dictated by the distance between opposing end caps and defined by the space within the interior walls of the inlet port.

The end caps, porous, allow water to flow into the enclosure upon operable breach, but have a through pore size small enough to prevent components within the seal compartment from falling out (e.g., the through pore size sufficiently small to contain the ball bearing rupture element). For example, the end caps may be an open mesh screen or through porous plate (e.g., composed of metal such as aluminum or plastic).

In various embodiments, barrier element 103 is a brittle diaphragm composed of a ceramic, glass or glass-ceramic plate, or it may be a brittle plastic material (e.g., a brittle ceramic plate) of sufficient thickness to provide structural integrity as well as barrier properties sufficient to prevent water permeation during storage, yet brittle enough to break, and preferably shatter, when engaged by the ball bearing upon deployment impact between the battery system and the waterbody. The ball bearing is of sufficient mass to break the brittle diaphragm on impact. The geometric shape of the solid body element (e.g., ball bearing) is generally non-limiting, and may take the form of a sphere or otherwise have one or more flat edges or even a protruding edge such as an angled V shape (e.g., the solid body having a star-like shape). Suitable materials from which the solid body rupture element may be composed include dense metals and ceramics (typically of density greater than 5 g/cc), such as steel and zirconia; for example, the rupture element(s) steel or zirconia ball bearings.

The rupture seal assembly relies on inertia to rupture (e.g., break) the barrier element. Accordingly, several variables should be considered to prevent premature breach as a result of rough handling during shipping or storage. Firstly, the inertia depends on the manner by which the battery system is deployed. Generally, a rupture seal is utilized when the impact force is large, and is typically employed for battery systems that are dropped from significant elevation or otherwise hit the waterbody with extreme force, such as would result when the battery system is deployed from an aircraft. Secondly, the size of the seal assembly and in particular the size of the barrier element (thickness and area) and mass of the rupture element will depend on the relative size of the container (and by that measure the size and number of battery cells) as well as the anticipated inertial impact and whether fast device startup is desired. Generally, larger seals and barrier elements are used to achieve fast device startup. Moreover, for large inertial impacts (e.g., impact associated with a high g-force), a thicker barrier plate may be employed which in turn makes the system more robust on handling. Smaller inertial impacts will require relatively thinner diaphragms and ball bearings of smaller mass. Of course, there is a balance between the diaphragm thickness and the mass of the ball bearings.

Figure 2:
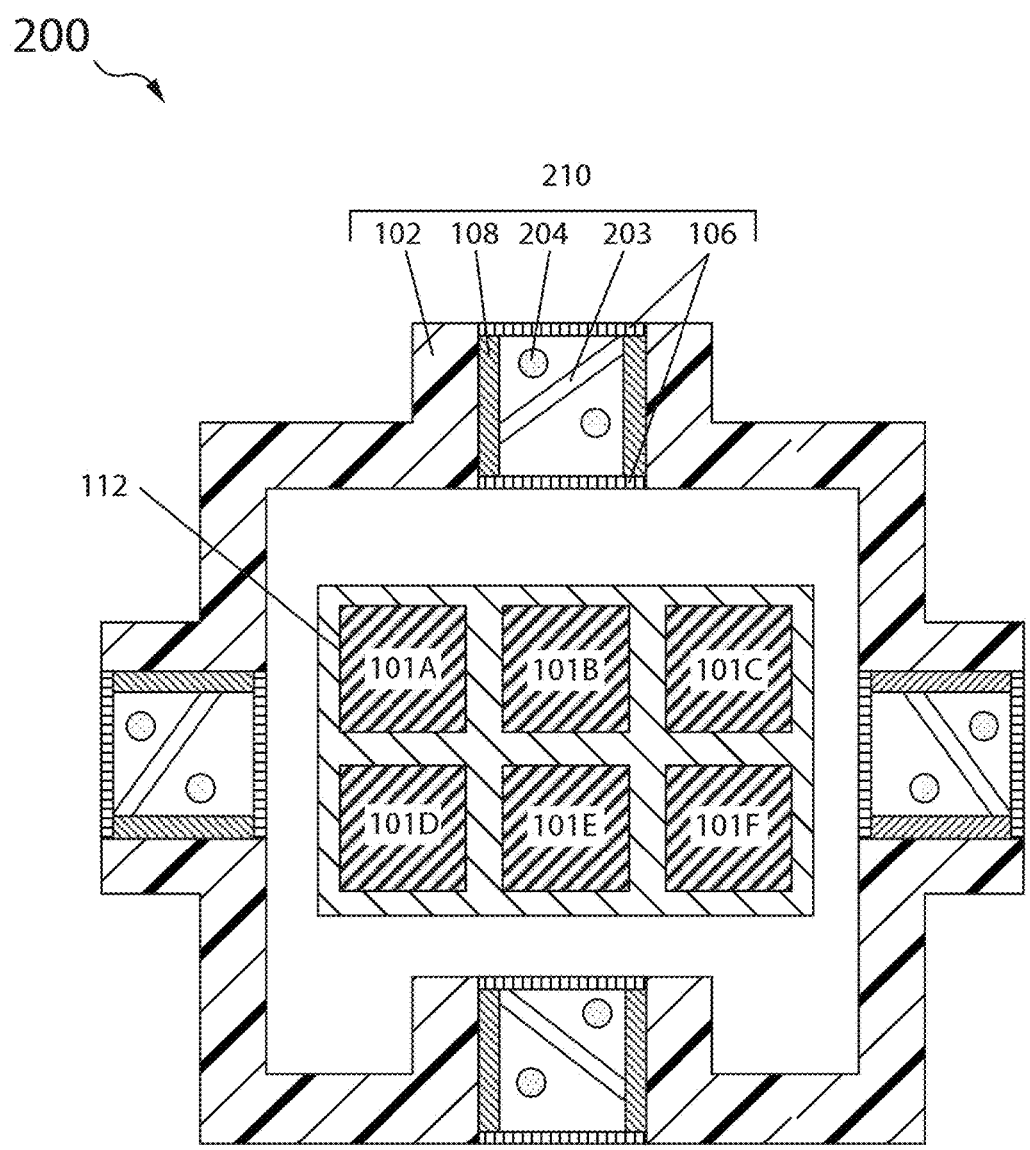
FIG. 2 is a schematic illustration of a battery system in accordance with an alternative embodiment of the present invention.

In a preferred embodiment, the battery system 200 illustrated in FIG. 2 includes an omni-directional hermetic enclosure 102 configured for operable breach substantially independent of impact geometry (i.e., independent of the orientation of the battery upon hitting the waterbody), and thus referred to herein as omni-directional. With reference to FIG. 2, each major container sidewall includes an inlet port and an associated rupture seal 210. The diaphragm barrier elements 203 are angularly positioned in their respective seal compartments (i.e., the diaphragms are not substantially perpendicular or parallel to the container sidewalls), and the diaphragms on opposing sidewalls are positioned as mirror images to each other. For example the diaphragms are positioned at an angle between 30° and 60° relative to their respective container sidewall, and typically also positioned at such said angle relative to the top and/or bottom porous cap; for example, the diaphragm positioned at about 30°, 45° or 60°. Moreover, the diaphragms, angularly positioned, effectively generate two sub-compartments each containing their own discrete rupture element 204 or elements. By this expedient the inertial forces created by impact will rupture at least one and generally two or more seals, regardless of the direction by which the enclosure impacts the waterbody on deployment. The battery cells configured together form battery pack 112.

Figure 3:
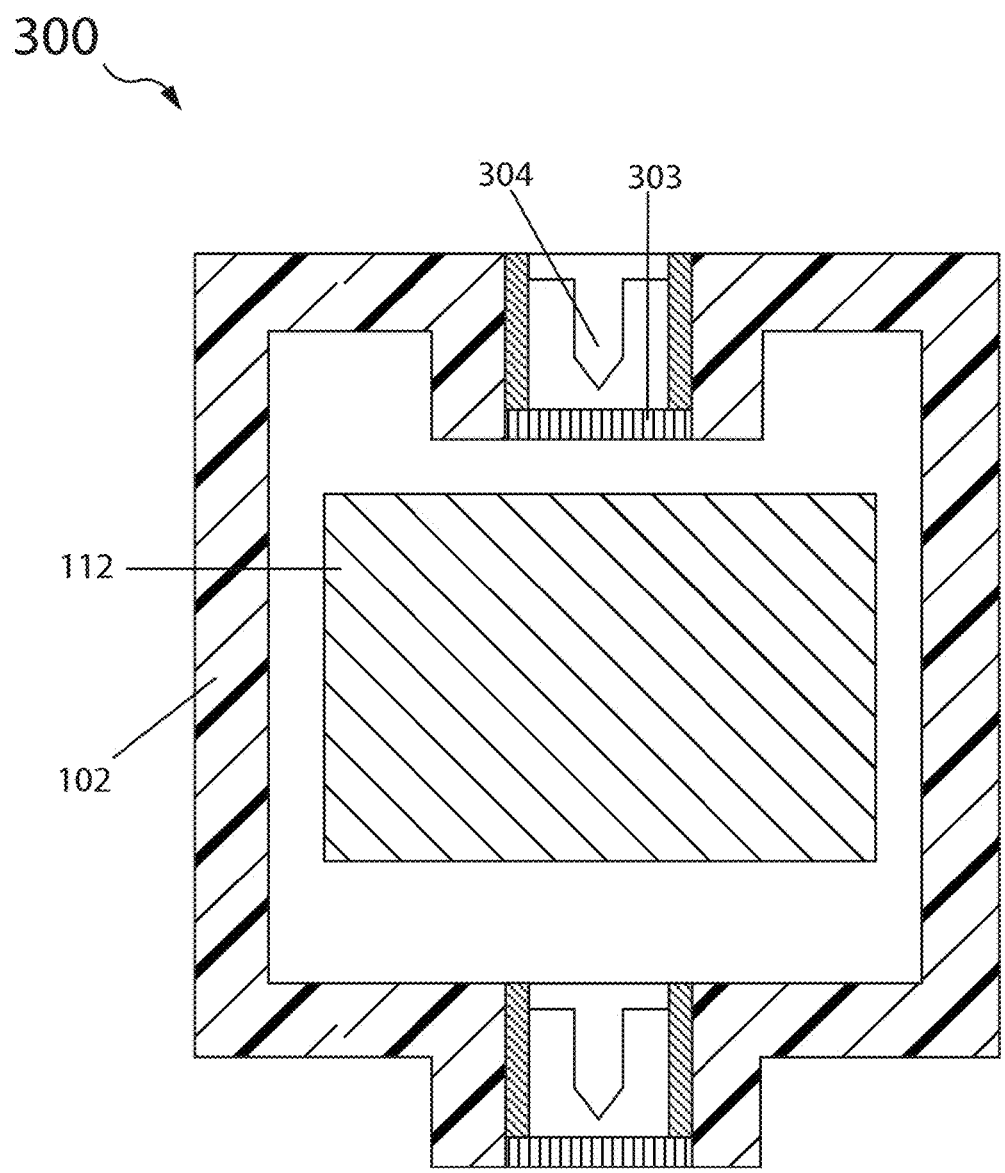
FIG. 3 is a schematic illustration of a battery system in accordance with an alternative embodiment of the present invention.

In an alternative embodiment, with reference to FIG. 3, the seal compartment serves as a bearing in which a punch-like rupture element 304 is fitted and therein constrained to a single degree of freedom in a direction along the length of the compartment. Compared to a seal structure having a free-floating unrestrained rupture element wherefore a brittle diaphragm is generally preferred, both brittle diaphragms (e.g., a ceramic, glass or glass-ceramic plate) and non-brittle diaphragms (e.g., a multilayer laminate as described above for use as a container sidewall) are generally suitable for use as barrier element 303 (e.g., a flexible multilayer laminate). To allow water flow through the port receptacle, punch-like element 304 has a porous base, and the open ends of the port receptacles have an inner lip (not shown) which is sufficient to contain the punch within the confines of the compartment during handling, and, may, by this expedient, mitigate the need for a top and/or bottom porous end-cap. In other embodiments the rupture element is restrained to an open end of the seal housing and may take the form of a spring loaded perforating pin/punch. The inertia created on deployment is sufficient to release the spring and/or cause the punch-like element to engage and rupture the diaphragm on impact, be it a brittle or non-brittle (e.g., semi-flexible) diaphragm such as a metal foil or plastic membrane (e.g., a multilayer laminate as diaphragm).

Figure 4:
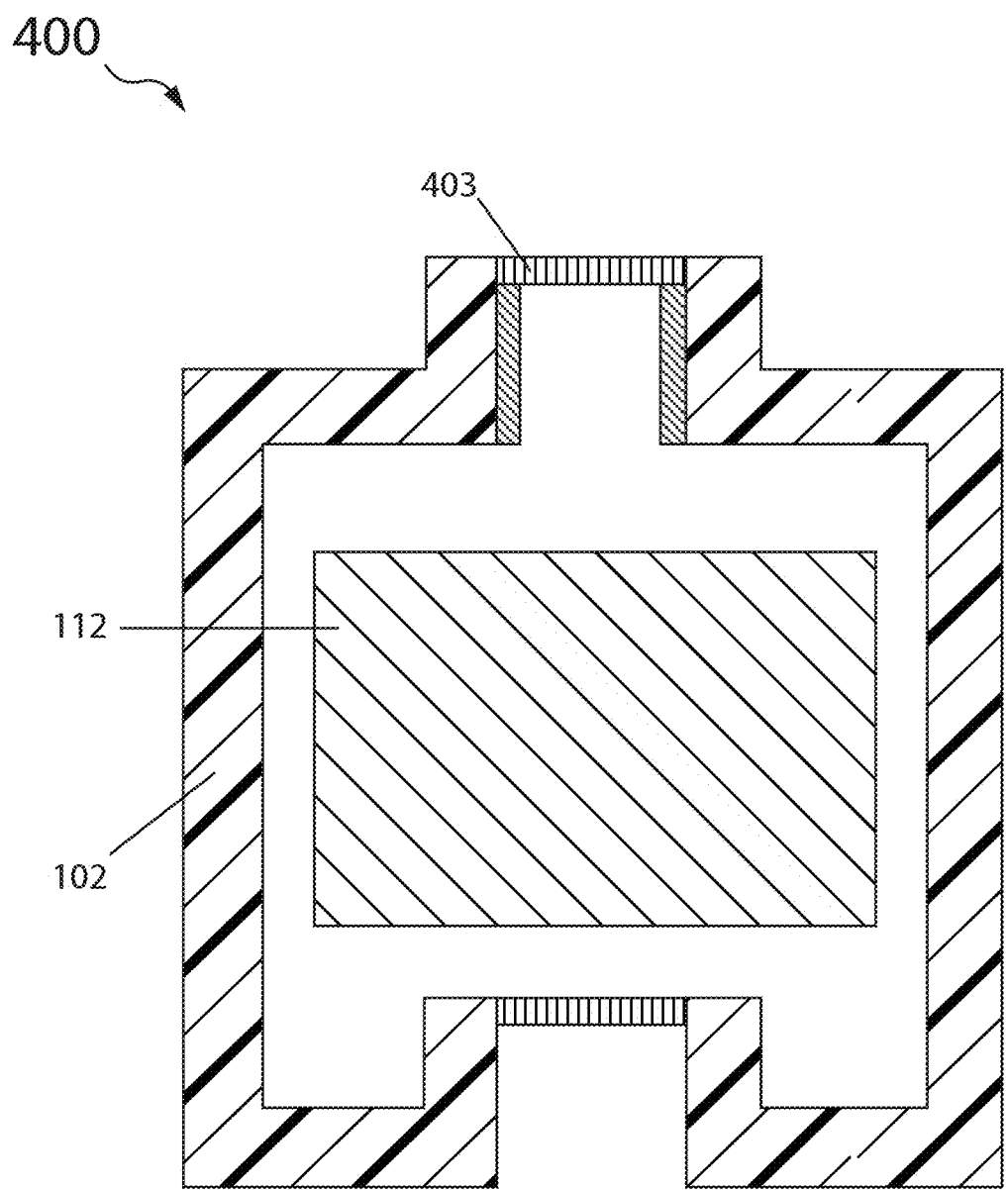
FIG. 4 is a schematic illustration of a battery system in accordance with an alternative embodiment of the present invention.
Figure 5:
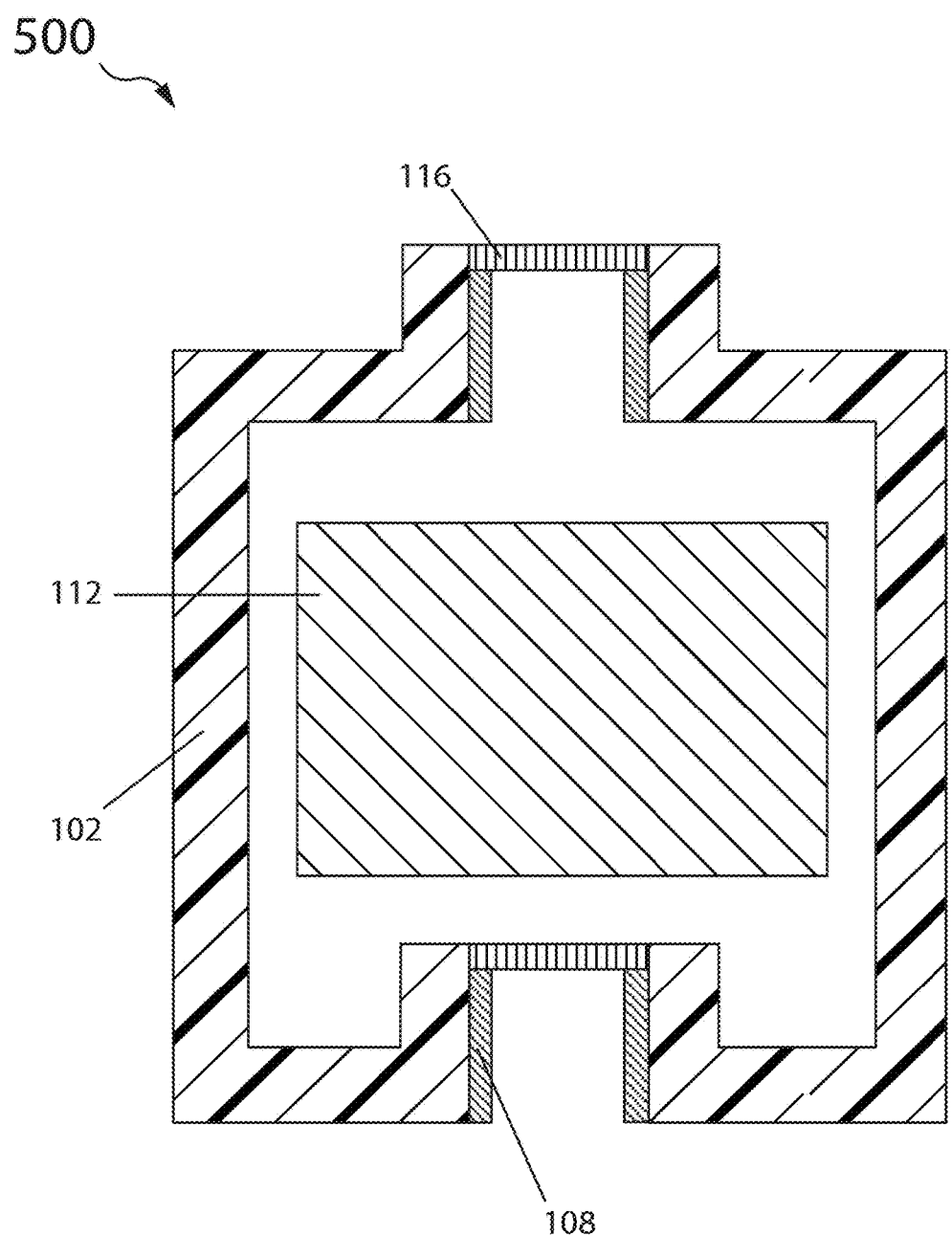
FIG. 5 is a schematic illustration of a battery system in accordance with an alternative embodiment of the present invention.

FIG. 4 shows a battery system in accordance with another embodiment of the instant invention, the battery system 400 having a chemically triggered seal assembly. The barrier element 403 of the seal may simply be a water reactive barrier membrane configured to or about the port receptacle (e.g., covering the top or bottom open end) to provide a permeation barrier against the ingress of ambient water during battery storage. On deployment, the membrane reacts with water and eventually disintegrates over time, typically dissolving, the dissolution leading to operable breach. Accordingly, in various embodiments the water reactive membrane barrier element is water-soluble, and may be composed of polyethylene oxide, polyamide-amines, polyethyleneimines, polystyrenes, and polyvinyl alcohols. Battery systems having a chemically triggered seal are particularly advantageous for applications requiring post deployment storage when the battery is intended to remain for some time in the waterbody prior to device start-up. The time period between immersion in the water body and operable breach is predominately controlled by the composition and thickness of the membrane barrier element. Another advantage of a chemically activated seal is that the rupture element is static, as opposed to the dynamic and moving rupture elements described above. Chemically activated rupture seals include not only soluble polymer membrane barrier elements, but also membranes that reactively dissolve, and more generally chemically decompose. A battery system substantially similar to that in FIG. 4 is illustrated in FIG. 5 with the one difference that battery system 500 has single port receptacle. Moreover, while the invention has generally been described with reference to battery systems having hermetic enclosures with 1, 2 or 4 port receptacles (i.e., inlet ports), the invention is not limited as such and it is contemplated that the hermetic enclosure includes many seal assemblies (e.g., more than 10) of similar or different construction.

Figure 6:
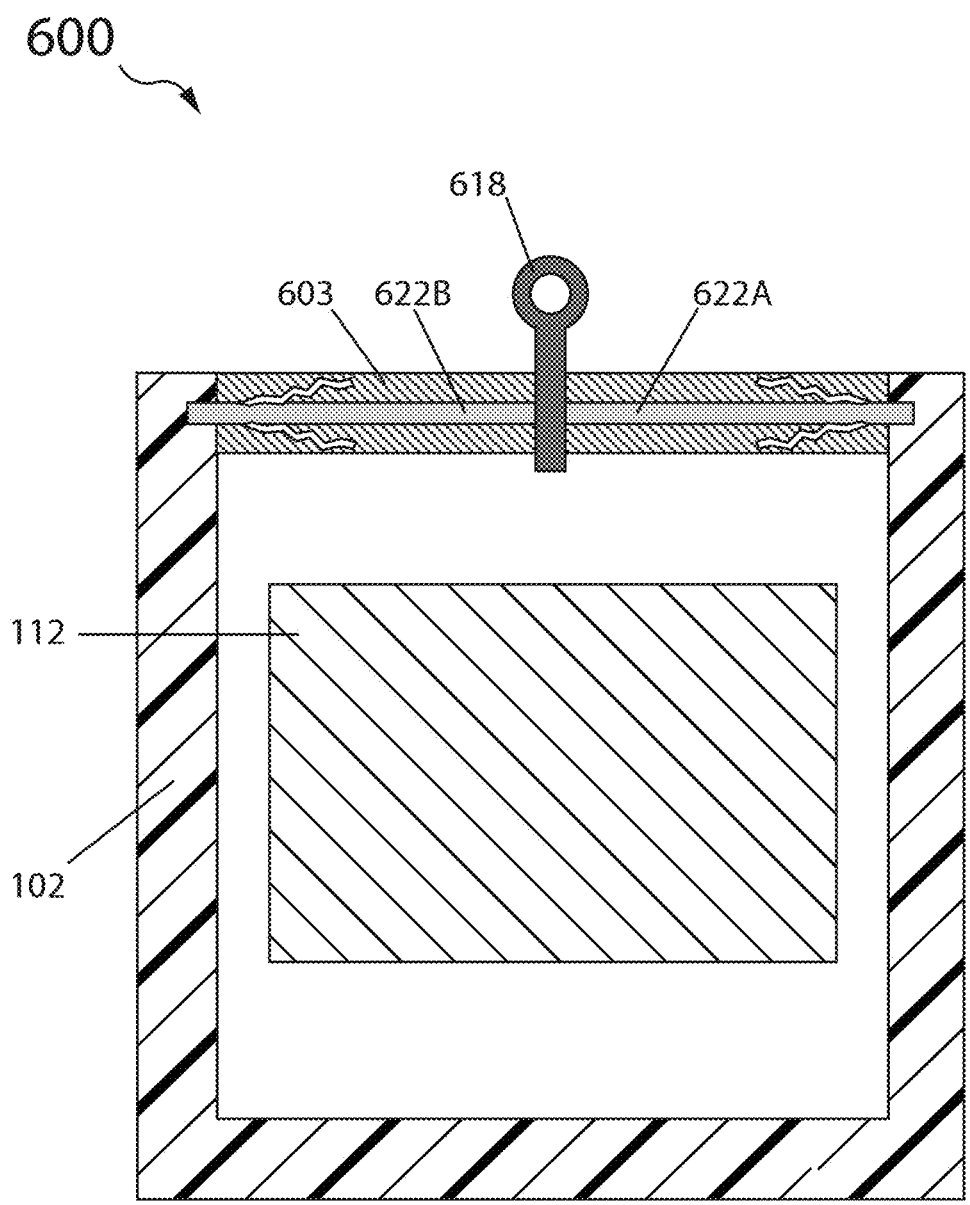
FIG. 6 is a schematic illustration of a battery system in accordance with an alternative embodiment of the present invention.

In yet another embodiment the battery system may have a seal assembly that is mechanically activated by a tug (i.e., a tug triggered seal assembly). With reference to FIG. 6 the battery system 600 includes a water impermeable plate as the barrier element 603 configured to the port receptacle (i.e., simply an opening in the container wall portion) for providing a water barrier. The plate 600 is typically held in place by compression. The plate, which may be spring loaded 624, is released by an operable tug, or more simply the barrier element may be corklike and composed of a material that is itself compressive and therefore sealable to the inner peripheral walls of the port receptacle. Continuing with reference to FIG. 6, the plate includes a pair of spring-loaded rods 622A/B disposed within an interior chamber of the plate. A first rod end interfacing with a port receptacle wall portion for the purpose of retaining the plate in a cover position, and the springs interfacing on one end with the rod and on the other end with the cover plate. Tugging release pin 618 causes the spring to unload, which in turn drives the rod to disengage from the container sidewall, and by this expedient the cover plate releases and the enclosure operably breached. In deployment, a person may physically pull the release pin, or the tug may be effectuated by dropping the battery system (e.g., off the side of ship) and having a tie element (e.g., a cord) interfacing with both the ship and the release pin, or the tug may be brought about in mid air by the release of a parachute apparatus tethered to the release pin via a tie element (e.g., tethered to the parachute of a sonobuoy). The parachute apparatus generally used as a decelerator and slows the decent of the sonobuoy apparatus (battery system combined with sonobuoy device), to an acceptable terminal velocity.

Pressure Seal

Figure 7:
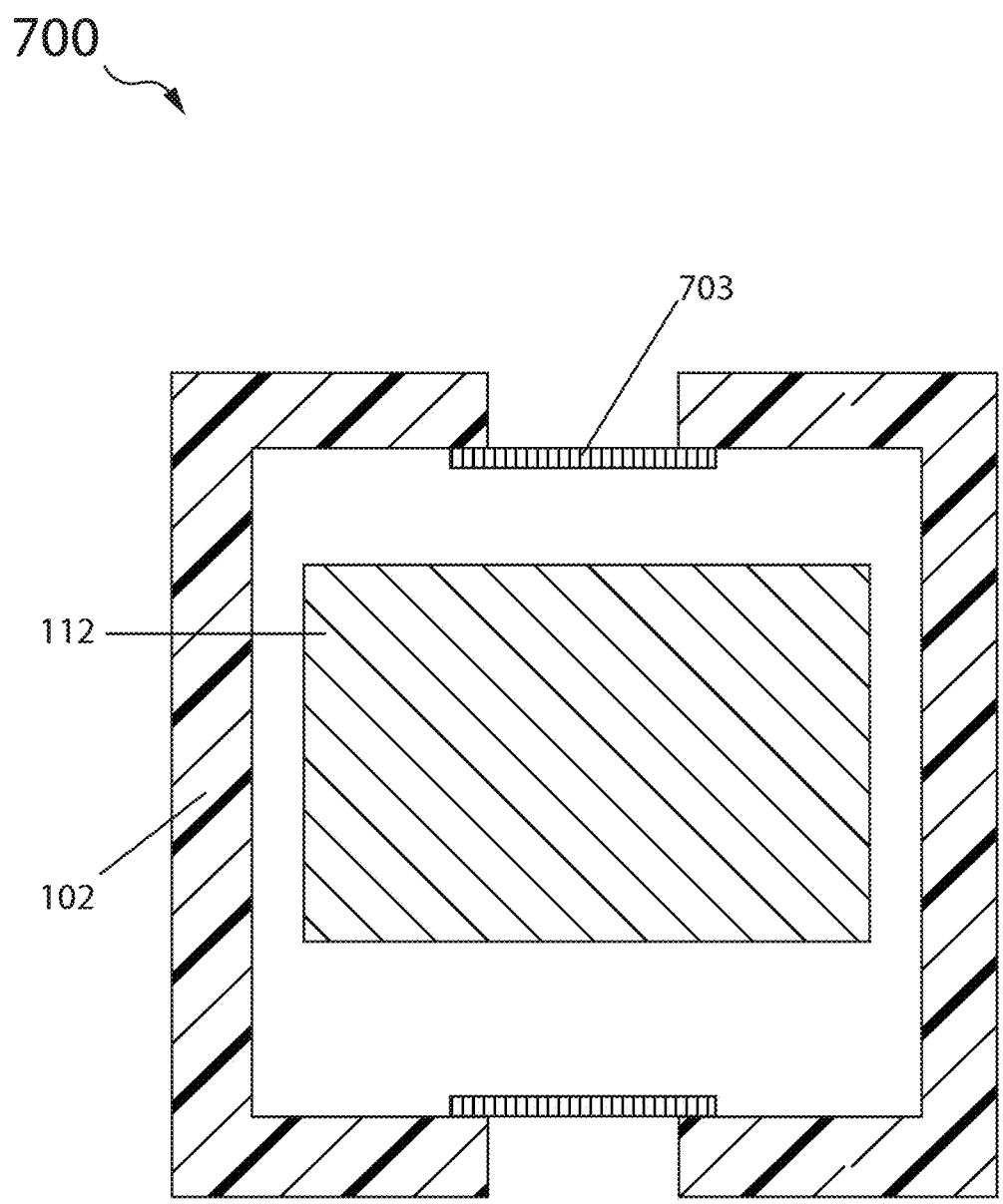
FIG. 7 is a schematic illustration of a battery system in accordance with an alternative embodiment of the present invention.

In yet another embodiment, as illustrated in FIG. 7, the battery system 700 has a differential pressure seal assembly that includes a barrier element 703 which is a solid plate 706 having an integral gasket (not shown). The hermetic enclosure is fabricated in a pressurized state (e.g., under a positive pressure of dry air or nitrogen) that provides a sufficient force against the gasket plate to maintain hermeticity during storage. Battery system deployment leads to operable breach as the gasket seal is disrupted by the inertia of battery impact with the waterbody.

Re-Sealing

Under various use considerations, it may be desirable to inhibit or prevent water flow through the port receptacles once a sufficient amount of waterbody liquid has entered the container (i.e., to close the ionic circuit). For instance, in various embodiments, as described further herein below, for batteries deployed from a cold environment and/or operated in a cold waterbody, performance advantage may be achieved by heating the initial waterbody liquid entering the enclosure upon operable breach, and thereafter restricting water flow across the ports. Other reasons to restrict water flow, post operable breach, include minimizing the adverse affects of extraneous ions, such as magnesium and calcium, which if present in the waterbody may interfere with battery discharge, for example by clogging the cathode electrode. Accordingly, restricting flow after breach, can inhibit/lessen clogging by limiting the total amount of extraneous ions reaching the cathode.

Accordingly, in various embodiments, the seal assemblies generally, and in particular those described above, may be configured to include a mechanism for transforming the battery system, post operable breach, from an open architecture to a closed or substantially closed architecture.

For instance, water flow restriction post operable breach may be achieved by using what is termed herein an obstruction component which interacts with incoming water to mitigate or prevent the continuance of water flow through the port receptacle. In various embodiments the obstruction component mitigates flow to a mere seepage of water flux, while in other embodiments it is configured to substantially seal off the ports, and preferably do so hermetically.

Figure 8:
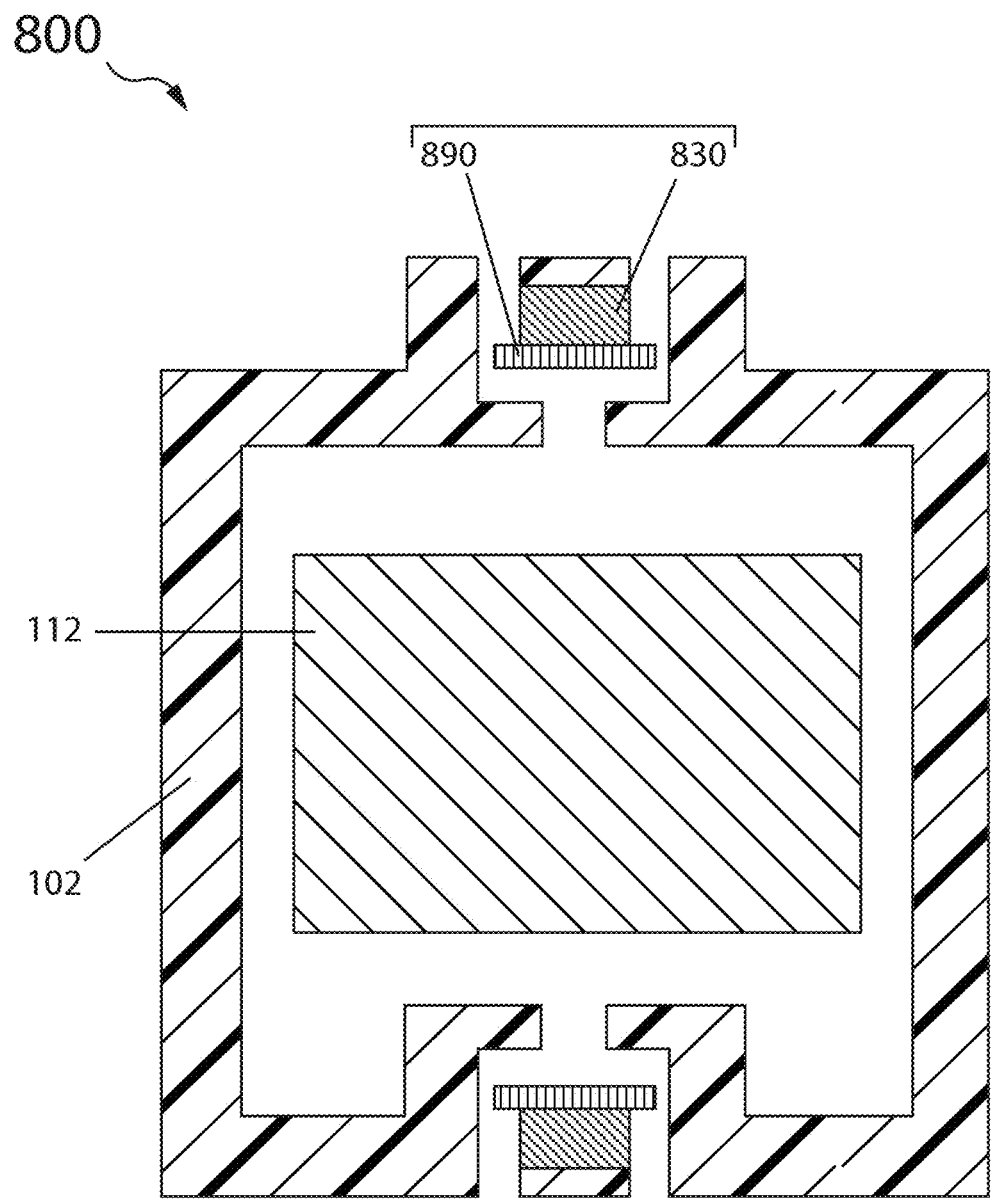
FIG. 8 is a schematic illustration of a battery system in accordance with an alternative embodiment of the present invention.
Figure 9:
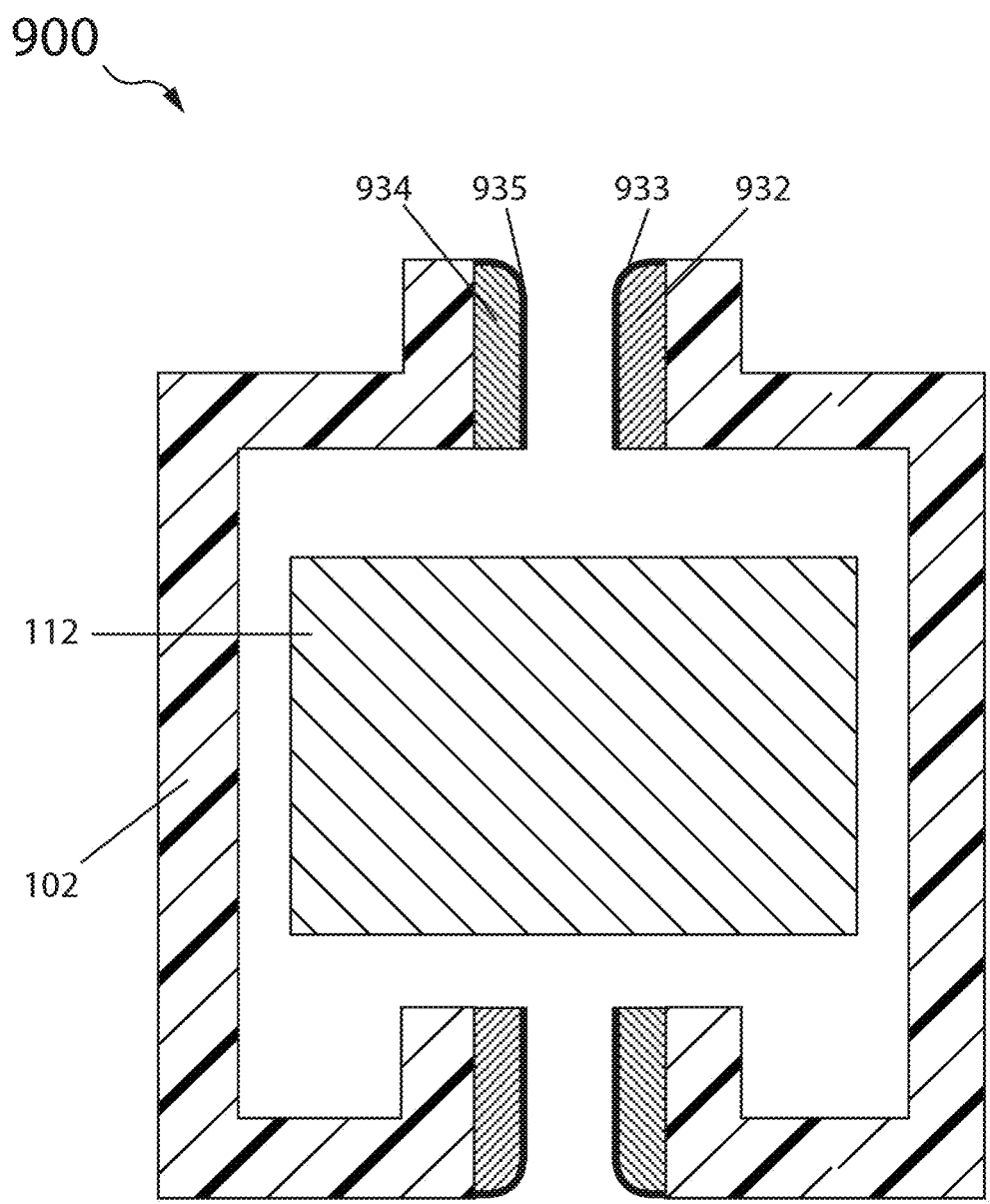
FIG. 9 is a schematic illustration of a battery system in accordance with an alternative embodiment of the present invention.

With reference to FIGS. 8-9, a reversible seal assembly may include an obstruction component 850 comprising a water expandable member 830 such as a water foaming/gelling polymer configured to re-seal the port receptacle post operable breach. As illustrated in FIG. 8, resealing may be realized as a result of the expanding gel 830 driving a solid plate gasket (e.g., a solid rubber plate) against the peripheral surface about an open port receptacle. Or, as illustrated in FIG. 9, a pair of expandable members 932/934 may be fitted with a stretchable gasket 933/935 for resealing purposes. The opening sealed off as the members expand toward each other and the gaskets mate to provide a barrier seal. Alternatively, the role of the expanding gel may be to serve as an obstruction in the seal compartment. With reference to FIGS. 1-3 the obstruction component 108 may simply be a water swellable polymer/foam that is shaped in the form of a cylinder and slotted to fit within the confines of the port receptacle in a region of the compartment behind the barrier element. Once operable breach is effected, the cylindrical polymer member reacts and swells with the incoming waterbody liquid whereby it ultimately encompasses the open spaces within the port receptacle to provide blockage and thus mitigate waterbody flow, and preferably limits the flow to a mere seepage.

Preferably the swellable polymer (i.e., gelable polymer) is capable of expanding by several hundred times or a thousand times when in direct contact with the waterbody liquid, but yet retains sufficient structural integrity that it does not disintegrate or fall apart and thus is capable of maintaining a sufficient seal for its intended purpose to mitigate water flow into/out of the enclosure. Particularly suitable materials for use as an expandable gel or foam are super absorbent polymers (SAP) such as sodium polyacrylate.

Battery Cells

Waterbody activated battery cells (e.g., seawater activated battery cells) having a protected lithium electrode and a cathode that makes use of seawater as an electroactive material and/or includes a solid electroactive material as cathode active, and which are particularly suitable for use herein as a battery cell of the instant battery systems, are fully described in U.S. Patent Application Publication No.: 20110269007 to Visco et al., and U.S. Pat. Nos. 7,645,543; 7,824,806; 7,282,295 to Visco et al., and all of which are herein incorporated by reference in their entirety. Moreover, protected alkali metal electrodes suitable for use herein as an alkali metal anode in battery cells of the battery systems of the instant invention are fully described in U.S. Pat. Nos. 7,645,543; 7,390,591; 7,824,806; 7,282,295 to Visco et al., all of which have already been incorporated by reference in their entirety.

In accordance with an aspect of the invention, an alkali metal seawater battery cell is provided which includes a thermal agent component (as described herein above and below), which is positioned nearby the anode and cathode structures for enhancing cell performance, and especially for warming up components of the anode and cathode structures to reduce their respective internal resistance, and ultimately the internal resistance of the cell. In various embodiments, activation of the thermal agent component generates sufficient heat to transition the cell to an operable state, and that absent the thermal agent the cell would be rendered inoperable and unable to deliver the requisite electrical power to the device for it is intended to operate. In accordance with this aspect the battery cell may be incorporated inside an hermetically sealed enclosure but is not necessarily incorporated as such. Specifically, in various embodiments the instant battery cell may be stored open to the external environment, especially when the thermal agent is sufficiently compatible in contact with ambient moisture.

Figure 10:
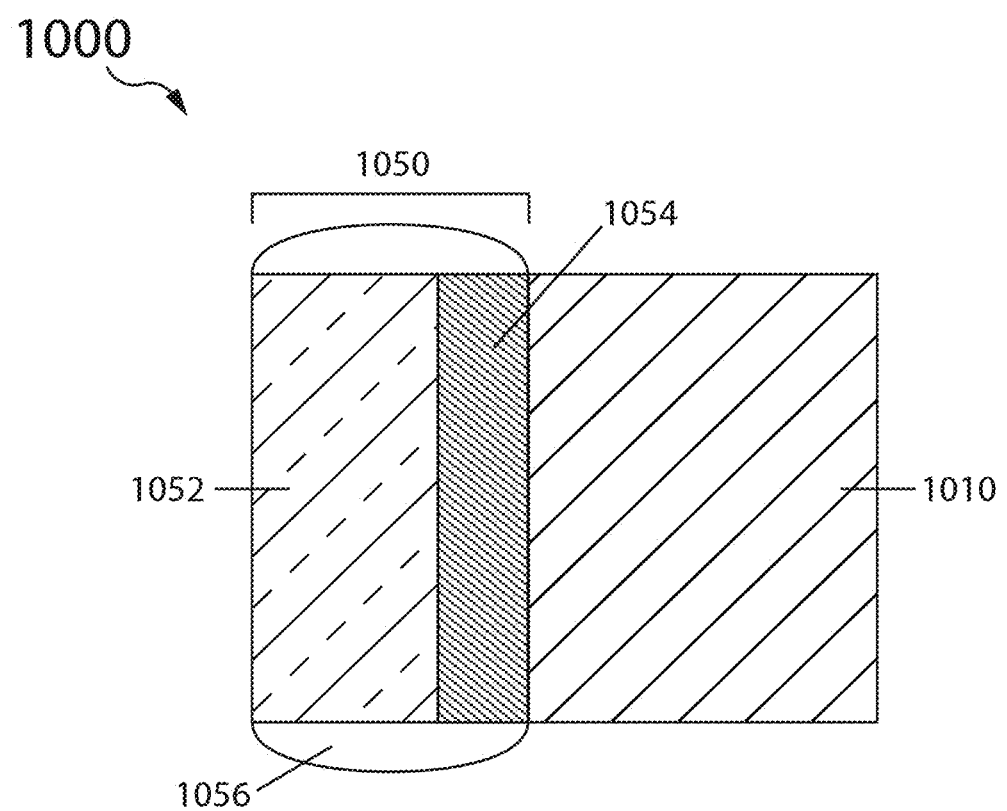
FIG. 10 is a schematic illustration of a battery cell in accordance with embodiments of the instant invention, and which is suitable for use in a battery system in accordance with various embodiments of the present invention.

An example of an individual open cathode architecture battery cell suitable for use herein is shown in FIG. 10. Applicants have already described such a battery cell in full detail in US patents and U.S. Patent Application Publication Nos. 20110269007 to Visco et al., and Assignee's US patents, specifically U.S. Pat. Nos. 7,645,543; 7,824,806; 7,282,295 to Visco et al., to Visco, and therefore will be but briefly described herein. The battery cell 1000 includes a cathode structure 1010 that is open to the external environment and a protected lithium anode 1050 which includes a lithium electroactive material layer (e.g., lithium metal foil or sinter) 1052 protected from contact with the external environment by a protective membrane architecture 1054, which, in combination with a suitable seal structure 1056, fully isolates, and generally encapsulates, the lithium metal layer. The protective membrane architecture may be a single substantially impervious lithium ion-conducting layer or a composite layer such as a laminate composite. Generally the membrane architecture includes a substantially impervious lithium ion conducting ceramic layer such as a glass layer, polycrystalline ceramic layer, or glass ceramic layer. The substantially impervious layer is at least impermeable to liquids and ambient moisture that it comes into contact with during battery cell storage and operation. Typically it is a sintered ceramic layer (e.g., a tape cast layer). Suitable ceramic compositions include those based on lithium germanium phosphate (LGP), such as lithium aluminum germanium phosphates (LAGP), and lithium titanium phosphates (LTPs), such as the lithium aluminum titanium phosphates sometimes referred to as LATP, and the like, as well as Garnet like ceramics which are known and described for their utility as a substantially impervious ceramic layer in the aforementioned protected lithium electrodes. The membrane may be a single monolithic layer of uniform composition or it may be itself a laminate membrane composed of two or more layers such as a bulk LATP layer having a surface layer (e.g., a coating) of Garnet or LGP or LAGP. In some embodiments the membrane architecture includes an interlayer which is chemically compatible in contact with the ceramic layer and the electroactive lithium material. In embodiments the interlayer is a porous separator layer such as a porous polyolefin separator impregnated with a non-aqueous lithium ion conducting anolyte (e.g., a liquid electrolyte such as that commonly employed in lithium batteries and lithium ion batteries). In other embodiments the interlayer may be a solid polymer electrolyte or a non-aqueous gel electrolyte. In some embodiments the interlayer is a sulfide glass or LiPON. The membrane architecture is chemically compatible on one side in contact with the lithium metal layer and chemically compatible on the other side with the external seawater environment (waterbody environment). The seawater contacts the membrane and the cathode and therein serves as an electrolytic medium for closing the ionic pathway between electrodes. Moreover, the membrane architecture is conductive to lithium ions, and by this expedient provides a pathway for lithium ions to migrate out of the protected anode and into the seawater electrolyte. In various embodiments the cathode structure includes an electron transfer medium, such as a porous carbon layer, for electro-reducing seawater. In such embodiments seawater serves as a cathode depolarizer, for electro-reducing oxygen and/or water itself, and the electron transfer medium may be catalyzed to promote the electro-reduction. In other embodiments the cathode includes a solid phace electroactive material such as a metal halide (e.g., AgCl, CuCl) and the like which are known to those of skill in the art as a seawater cathode material, including those described in the present Assignee's aforesaid patents previously incorporated by reference herein.

In various embodiments the battery cell is constructed with a spatial gap between the cathode and the substantially impervious ceramic membrane of the lithium anode structure. In certain embodiments thereof, thermal agent is disposed in the gap.

In various embodiments the spatial gap between the protected lithium electrode and the cathode includes an electrolyte reservoir, which is a porous material body, and generally therein considered to be a component of the cathode structure. The reservoir may be a carbonaceous porous materials including carbon-based foams, cloths, papers; metal-oxide porous materials including zirconia, alumina, magnesia felts and cloths; polymeric porous materials including polyolefin (polypropylene, polyethylene) porous films; and porous bodies based on combinations of ceramic and polymeric materials, including ceramic-coated polymeric films.

In some embodiments the cathode is a porous body with a high specific surface area and is free of pre-loaded thermal agent, and these cathode features are beneficial for rapid cell startup. In other embodiments a smooth cathode is employed.

In various embodiments the porous reservoir structure contains thermal agent material incorporated into a portion of its pores, and thus leaving empty a corresponding pore portion. Generally, there needs to be a sufficient amount of open pores that are devoid of thermal agent as to promote rapid infiltration of waterbody liquid. For instance, in various embodiments 90%, 80%, 70%, 60%, 50% of the pore space is devoid of thermal agent.

In some embodiments, the hydrophilicity and wettability of the electrolyte reservoir could be increased with various pre-treatments in order to facilitate rapid filling of the electrolyte reservoir with aqueous electrolytes including seawater.

Various surface treatments can improve wettability of porous battery structures (i.e. cathode and separator) and accelerate their filling with aqueous electrolytes. The following measures can improve wettability:
1. Treatment of porous structures with surfactants.
2. Coating of porous structures with hydrogels.
3. Surface pretreatment of carbonaceous porous structures with oxidizing agents, such as $CO_2$, $NO_2$ at high temperature, $H_2O_2$+$H_2SO_4$, $HNO_3$, $KMnO_4$ (+$H_2SO_4$), $CrO_3$, $HClO$, $ClO_2$.

In various embodiments, the electrolyte reservoir layer has a pore size distribution tailored for holding a specific amount of pre-loaded dry thermal agent in a minimal volume. This amount of thermal agent is determined to be sufficient for providing required electrolyte conductivity and for acting as a reagent in an exothermic reaction with water and/or other thermal agents initiated at the start of discharge. In these embodiments, electrolyte reservoir macropores with radii selected from the ranges 100 nm-1 um, 1 um-10 um, 10 um-50 um constitute 80%-85%, 85%-90%, 90%-95% of the electrolyte reservoir total pore volume.

In various embodiments the relationship between pore size distributions of electrolyte reservoir and cathode is chosen to favor predominant deposition of the thermal agent(s) in the electrolyte reservoir rather than in cathode. In these embodiments, electrolyte reservoir pores have radii larger than those of cathode pores that provide more than 80%-85%, 85%-90%, 90%-95% of cathode pore volume.

In some embodiments, the electrolyte reservoir is predominantly monoporous (has a unimodal pore size distribution).

In some embodiments, the electrolyte reservoir has a bimodal pore size distribution. Here, larger pores provide the volume for pre-loading of the required amount of dry thermal agent while the smaller pores remain free of the dry salt and provide channels for rapid electrolyte access into the bulk of the electrolyte reservoir and thus improve kinetics of thermal agent dissolution and/or kinetics of exothermic reaction between the thermal agent and water or other thermal agents.

In various embodiments, the major surface of the electrolyte reservoir is not in intimate contact with anode and/or cathode major surfaces. The gap(s) adjacent to the "major" electrolyte reservoir surface facilitate rapid filling of entire electrolyte reservoir porous volume with aqueous electrolytes including seawater. In one embodiment, the gap is located between electrolyte reservoir and anode, in another—between electrolyte reservoir and cathode, in the third embodiment there are two gaps, both between electrolyte reservoir and anode and between electrolyte reservoir and cathode.

Thermal Agent

In various embodiments the instant battery system includes a thermal agent component for heating one or more battery system components upon operable breach of an hermetic enclosure in which it (the thermal agent) is disposed. Typically the thermal agent component is a material triggered to evolve heat via an exothermic reaction when contacted by water, be it water vapor or liquid water (e.g., the waterbody liquid). In various embodiments the thermal agent is incorporated within the internal confines (i.e., the interior) of an operably breechable hermetic battery enclosure as are described above. In some embodiments the thermal agent is disposed in a discrete substantially hermetic secondary container absent the other battery cell components, such as a capsule, which, in some embodiments, may be composed of a material that dissolves over time in water (e.g., a time released capsule). In various embodiments the thermal agent is disposed in the battery cell which is generally stored open to the external environment. When incorporated in a secondary container, the thermal agent and said container may, in combination, be referred to as a thermal agent component. Moreover, in accordance with the invention, the thermal agent is not an electro-active material of the anode or that of the cathode, and as such, if left un-reacted by the waterbody liquid, does not yield amp-hour capacity to the battery. In various embodiments the thermal agent is in the form of a compact of the thermal agent material (e.g., a bulk or film-like powder compact or material sinter). The thermal agent compact is typically disposed adjacent to the battery cell, and even more typically adjacent one or both the anode and cathode electrode, and may be incorporated within the pore structure of the cathode. For a multi-cell battery, a thermal agent compact may be disposed nearby each cell and/or decorated about the interior confines of the container (e.g., interfacing with the container walls or rigid wall skeleton). The thermal agent compact may be composed solely of the thermal agent material, or it may be a composite, such as a compacted mixture or the thermal agent and a binder. In some embodiments the thermal agent is disposed within the confines of the cathode (e.g., within the pore structure of the cathode).

Generally, the thermal agent is disposed nearby a battery component for which it is intended to provide a sufficient amount of heat, when reacted with water, to allow the battery to provide the necessary power output, especially during start-up and particularly when the battery is stored at low temperature or the temperature of the waterbody in which the battery operates is a cold temperature (e.g., 10° C. or lower). The thermal agent compact may be loaded in a region between the anode and cathode. For instance, the thermal agent may be loaded in a solid carrier material, such as material sheet composed of the thermal agent and a binding agent or the carrier sheet, porous, may further serve as a separator material. In other embodiments the thermal agent may be disposed within the confines of the cathode electrode pores, such as in the pore structure of a carbonaceous cathode structure.

In embodiments the thermal agent is disposed nearby the anode structure and/or cathode structure, and in sufficient amount and proximity such that whence the thermal agent is activated for reaction (e.g., by contact with liquid waterbody), it (the thermal agent reaction) is capable of heating the waterbody liquid serving as electrolyte and/or battery cell component to a sufficient temperature to facilitate power delivery.

The thermal effect of a physicochemical process is determined based on change in standard enthalpy of its reagents and products. Change in enthalpy is calculated as a sum of enthalpies of all reagents participating in the process subtracted from the sum of enthalpies of all products. Enthalpy of each component is multiplied by its stoichiometric coefficient in the reaction equation.

In various embodiments the thermal agent evolves heat based on one or more of the following processes and may be one or more of the following materials:

Dissolution of thermal agent(s) in water. Examples: LiCl, KOH, $CaCl_2$ (anhydrous), $AlCl_3$ (anhydrous, with partial hydrolysis), $LiAlCl_4$ (anhydrous, with partial hydrolysis), $Mg(ClO_4)_2$ (anhydrous), $MgSO_4$ (anhydrous).

Rapid corrosion of metallic thermal agents or their alloys in water. Examples: Li, Ca, Mg, and their alloys or binary or ternary compounds with Al, Sn, Si, B, C and other metals or non-metals Chemical reaction (hydrolysis, hydration) of compound (s) with water. Moderate gas evolution is beneficial as it promotes mixing and heat transfer, but its rate should not be so large as to impede water influx and heat transfer.

Examples of thermal agents that undergo exothermic hydration: $Li_2O$, $Li_2S$, CaO.

Examples of thermal agents that undergo exothermic hydrolysis: $LiNH_2$, Li dimethylamide, $LiOCH_3$ and other Li alkoxides, LiH, $LiAlH_4$.

If one of the products of hydrolysis or hydration reaction is a base (commonly LiOH), heat production can be increased even further by pre-loading another thermal agent, such as a solid acid or acidic salt, which exothermically reacts with the produced base (neutralization). Examples of solid acids and acidic salts: $NH_4Cl$, $H_3BO_3$, $AlCl_3$.

Exothermic reaction between two or more solid thermal agents that occurs only in the presence of water. Commonly, these are oxidation-reduction reactions, therefore at least one of the thermal agents should be an oxidizer and at least one should be a reducer.

Examples of reducers: $Li_2S$, $Li_2S_2O_5$, $LiAlH_4$, Mg, Zn, $TiH_2$, $Al_2H_6$.

Examples of oxidizers: $Li_2O_2$, $BaO_2$, $LiClO_2$, $LiClO_3$, $MnO_2$, $KMnO_4$, $K_2Cr_2O_7$, $CuSO_4$.

Examples of mixtures known to generate significant amount of heat in presence of water: $Zn+CuSO_4.5H_2O$, $Na_2S_2O_5.5H_2O+H_2O_2.(NH_4)_2CO$.

The thermal effect of a physicochemical process is determined based on change in standard enthalpy of its reagents and products. Change in enthalpy is calculated as a sum of enthalpies of all reagents participating in the process subtracted from the sum of enthalpies of all products. Enthalpy of each component is multiplied by its stoichiometric coefficient in the reaction equation.

A. Dissolution:
1. LiCl solid→$Li^+$aq+$Cl^-$aq
$\Delta H=-37.1$ kJ/mol
Heat production per unit of weight is 875 J/g, per unit of volume 1812 J/cm$^3$
2. $CaCl_2$ solid→$Ca^{2+}$aq+$2Cl^-$aq
$\Delta H=-81.8$ kJ/mol
Heat production per unit of weight is 737 J/g, per unit of volume 1585 J/cm$^3$
3. $MgSO_4$ solid→$Mg^{2+}$aq+$SO_4^{2-}$aq
$\Delta H=-91.3$ kJ/mol
Heat production per unit of weight 758 J/g, per unit of volume 2018 J/cm$^3$
4. $Mg(ClO_4)_2$ solid→$Mg^{2+}$aq+$2ClO_4^-$aq
$\Delta H=-156.6$ kJ/mol
Heat production per unit of weight 576 J/g, per unit of volume 1267 J/cm$^3$
5. KOH solid→$K^+$aq+$OH^-$aq
$\Delta H=-57.8$ kJ/mol
Heat production per unit of weight 1030 J/g, per unit of volume 2106 J/cm$^3$ B. Corrosion:
6. 2Li solid+$2H_2O$→$2Li^+$aq+$2OH^-$aq+$H_2$
$\Delta H=-445.4$ kJ/mol
Heat production per unit of weight 32085 J/g, per unit of volume 17133 J/cm$^3$
7. Mg solid+$2H_2O$ $Mg(OH)_2$+$H_2$
$\Delta H=-352.9$ kJ/mol
Heat production per unit of weight 14520 J/g, per unit of volume 25264 J/cm$^3$ C. Hydration and hydrolysis:
8. CaO solid+$H_2O$→$Ca(OH)_2$ solid
$\Delta H=-64.5$ kJ/mol
Heat production per unit of weight 1150 J/g, per unit of volume 3842 J/cm$^3$
9. $Li_2O$ solid+$H_2O$ 2Li aq+2$OH^-$aq
$\Delta H=-133.3$ kJ/mol
Heat production per unit of weight 4460 J/g, per unit of volume 8980 J/cm$^3$
10. $Li_2S$ solid+$H_2O$→$2Li^+$aq+$OH^-$aq+$HS^-$aq
$\Delta H=-804.6$ kJ/mol
Heat production per unit of weight 1685 J/g, per unit of volume 2763 J/cm$^3$
11. $Li_2O$ solid+$2NH_4Cl$ solid+$H_2O$→$2Li^+$aq+$2Cl^-$aq+$2NH_4OH$ aq
$\Delta H=-103.9$ kJ/mol
Heat production per unit of weight 759 J/g, per unit of volume 1218 J/cm$^3$ D. Oxidation/reduction reactions:
12. Zn solid+$CuSO_4$ solid→Cu solid+$Zn^{2+}$aq+$SO_4^{2-}$aq
$\Delta H=-291.8$ kJ/mol
Heat production per unit of weight 1297 J/g, per unit of volume 5455 J/cm$^3$
13. $TiH_2$ solid+$3Li_2O_2$ solid+$2H_2O$→$6Li^+$aq+$6OH^-$aq+$TiO_2$
$\Delta H=-739.5$ kJ/mol
Heat production per unit of weight 2315 J/g, per unit of volume 5956 J/cm$^3$
14. $Li_2S$ solid+$4Li_2O_2$ solid+$4H_2O$→$10Li^+$aq+$SO_4^{2-}$aq+$8OH^-$aq
$\Delta H=-1412.5$ kJ/mol
Heat production per unit of weight 6155 J/g, per unit of volume 13144 J/cm$^3$ Battery Activation Prior to Immersion in Seawater If the battery is dropped from an airplane with a parachute, it takes several minutes to reach the water surface. In order to expedite battery activation, the battery can be heated up prior to immersion in seawater.

When the battery system is released from an airplane, a seal is broken and moist ambient air penetrates into the battery compartment. If the battery contains compounds that react with air with heat evolution, they can be used to start heating the battery before it reaches the ocean surface. The following compounds can play this role:
Lithium alkoxides, particularly $LiOCH_3$
Lithium amide and alkylamides
LiH
$LiAlH_4$ Amount of Thermal Agent The amount of thermal agent necessary (or sufficient) depends in large measure on the type of thermal agent, the thermal properties of the battery cell components and the temperature of the waterbody. The following examples qualitatively illustrate the primary parameters for making that determination.

Calculation of Thermal Agent Amount Necessary to Heat Up Battery Components from −20° C. to +20° C.

The following components are being heated:
Li metal, 1 mm thick;
Protective solid electrolyte membrane, 0.15 mm thick;
Seawater in the gap between the PLE and cathode surface (Temperature of ambient seawater is no lower than 0° C.);
Activator itself.

Heat capacity of other battery components, such as anolyte, porous cathode and separator, is assumed to be negligible.

$Li_2O$, which reacts with water forming a LiOH solution, was chosen as the most effective heat generator and was used in all the following calculations. Besides generating heat it also forms a highly conductive medium for cathode compartment and its alkaline solution improves wettability of porous materials.

Calculations are performed for 1 cm² of active battery area.

Lithium Metal, 1 mm thick., Cp=24.8 J/mol/K=3.573 J/g/K
  Weight 1 cm²×0.1 cm thick×0.534 g/cm³=0.0534 g
  Required heat 3.573 J/g/K×0.0534 g×(293−253)° K=7.63 J
Glass-Ceramic Plate, 0.15 mm thick., Cp=0.75 J/g/K
  Weight 1 cm²×0.015 cm thick×3.05 g/cm³=0.0458 g
  Required heat 0.75 J/g/K×0.0458 g×(293−253)° K=1.37 J
Seawater in 1 mm gap, Cp=3.985 J/g/K
  Weight 1 cm²×0.1 cm thick×1.028 g/cm³=0.1028 g
  Required heat 3.985 J/g/K×0.1028 g×(293−273)° K=8.19 J
Thermal Agent, Cp=54.1 J/mol/K=1.811 J/g/K
  Required heat 1.811 J/g/K×0.004 g×(293−253)° K=0.3 J
Total required heat 7.63+1.37+8.19+0.3=17.49 J
Assuming that 1 g of $Li_2O$ generates 4460 J, required load is:
  17.49/4460≅0.004 g/cm²
  Load by volume is 0.0019 cm³/cm²

After hydration and dissolution in seawater this amount of $Li_2O$ forms a 2.68M solution of LiOH. It reacts with 0.1292M of magnesium salt and 0.08M of calcium salt from seawater, and the final solution contains 2.34M LiOH. This solution can serve as a good battery catholyte with high ionic conductivity.

If lithium sulfide ($Li_2S$) is used as a battery activator instead of lithium oxide, the required load is:
Lithium Metal, 1 mm thick., Cp=24.8 J/mol/K=3.573 J/g/K
  Weight 1 cm²×0.1 cm thick×0.534 g/cm³=0.0534 g
  Required heat 3.573 J/g/K×0.0534 g×(293−253)° K=7.63 J
Glass-Ceramic Plate, 0.15 mm thick., Cp=0.75 J/g/K
  Weight 1 cm²×0.015 cm thick×3.05 g/cm³=0.0458 g
  Required heat 0.75 J/g/K×0.0458 g×(293−253)° K=1.37 J
Seawater in 1 mm gap, Cp=3.985 J/g/K
  Weight 1 cm²×0.1 cm thick×1.028 g/cm³=0.1028 g
  Required heat 3.985 J/g/K×0.1028 g×(293−273)° K=8.19 J
Thermal Agent, Cp=61.6 J/mol/K=1.341 J/g/K
  Required heat 1.341 J/g/K×0.011 g×(293−253)° K=0.59 J
Total required heat 7.63+1.37+8.19+0.59=17.78 J
Assuming that 1 g of $Li_2S$ generates 1685 J, required load is:
  17.78/1685≅0.011 g/cm²
  Load by volume is 0.0067 cm³/cm²

For lithium chloride (LiCl) as battery activator the required load is:
Lithium Metal, 1 mm thick., Cp=24.8 J/mol/K=3.573 J/g/K
  Weight 1 cm²×0.1 cm thick×0.534 g/cm³=0.0534 g
  Required heat 3.573 J/g/K×0.0534 g×(293−253)° K=7.63 J
Glass-Ceramic Plate, 0.15 mm thick., Cp=0.75 J/g/K
  Weight 1 cm²×0.015 cm thick×3.05 g/cm³=0.0458 g
  Required heat 0.75 J/g/K×0.0458 g×(293−253)° K=1.37 J
Seawater in 1 mm gap, Cp=3.985 J/g/K
  Weight 1 cm²×0.1 cm thick×1.028 g/cm³=0.1028 g
  Required heat 3.985 J/g/K×0.1028 g×(293−273)° K=8.19 J
Thermal Agent, Cp=48.0 J/mol/K=1.132 J/g/K
  Required heat 1.132 J/g/K×0.021 g×(293−253)° K=0.95 J
Total required heat 7.63+1.37+8.19+0.95=18.14 J
Assuming that 1 g of LiCl generates 875 J, required load is:
  18.14/875≅0.021 g/cm²
  Load by volume is 0.0101 cm³/cm²

If the battery cathode has a significant load of active material, such as CuSCN, it also has to be included in the calculations for the required heat. In the case of copper or silver salts being used as an active material, alkali formation would lead to decomposition of these salts and therefore is undesirable Anhydrous magnesium sulfate is a good heating agent as its aqueous solution is neutral or slightly acidic, making it safe for battery components.

For magnesium sulfate ($MgSO_4$) as battery activator the required load is:
Lithium Metal, 1 mm thick., Cp=24.8 J/mol/K=3.573 J/g/K
  Weight 1 cm²×0.1 cm thick×0.534 g/cm³=0.0534 g
  Required heat 3.573 J/g/K×0.0534 g×(293−253)° K=7.63 J
Glass-Ceramic Plate, 0.15 mm thick., Cp=0.75 J/g/K
  Weight 1 cm²×0.015 cm thick×3.05 g/cm³=0.0458 g
  Required heat 0.75 J/g/K×0.0458 g×(293−253)° K=1.37 J
Seawater in 1 mm gap, Cp=3.985 J/g/K
  Weight 1 cm²×0.1 cm thick×1.028 g/cm³=0.1028 g
  Required heat 3.985 J/g/K×0.1028 g×(293−273)° K=8.19 J
Solid phase active cathode material (CuSCN), Cp=88.5 J/mol/K=0.728 J/g/K
  Weight corresponding to Li capacity is 0.936 g
  Required heat 0.728 J/g/K×0.936 g×(293−253)° K=27.24 J
Thermal Agent, Cp=96.5 J/mol/K=0.802 J/g/K
  Required heat 0.802 J/g/K×0.061 g×(293−253)° K=1.95 J
Total required heat 7.63+1.37+8.19+27.24+1.95=46.38 J
Assuming that 1 g of $MgSO_4$ generates 758 J, required load is:

$46.38/758 \cong 0.061$ g/cm$^2$

Load by volume is 0.0229 cm$^3$/cm$^2$

In various embodiments employing multiple thermal agents that react with each other once the cell is filled with aqueous electrolyte, two or more distinct electrolyte reservoirs are pre-loaded with two or more different thermal agents prior to discharge. In some of these embodiments, the electrolyte reservoirs are made from different porous materials. Also, in some embodiments, electrolyte reservoirs are separated from each other by a gap.

In specific embodiments utilizing Li$_2$O to heat up the battery, 0.004 g of pre-loaded Li$_2$O is required per 1 cm$^2$ of active cathode area. Assuming that separator porosity is 85% and its thickness is 0.3 mm (zirconia cloth ZYK from Zircar Zirconia, Inc.) only 8% of separator porous volume would be loaded with Li$_2$O.

In one embodiment, the following method is employed for pre-loading macroporous electrolyte reservoir with dry thermal agent while leaving the cathode pore space predominantly empty. A half-cell (electrolyte reservoir in contact with cathode) is filled with a saturated thermal agent solution; then the solvent is allowed to evaporate slowly, thus maintaining conditions close to thermodynamic equilibrium of the system. As a result, solid thermal agent preferentially precipitates in macropores, which are predominantly located in the electrolyte reservoir.

In alternate embodiments, the electrolyte reservoir is filled with thermal agent before the half-cell is assembled and the electrolyte reservoir is brought in contact with the cathode.

In some embodiments, the electrolyte reservoir layer is absent and the cathode layer is pre-loaded with thermal agent instead.

In various embodiments, the following methods can be used for loading the electrolyte reservoir with solid thermal agent(s):

1. Filling the porous space of the reservoir layer by air-spraying a slurry or a solution of thermal agent. One or more cycles of impregnation followed by drying can be used. In some embodiments, the reservoir layer is heated during impregnation.
2. Vacuum impregnation of the reservoir layer with thermal agent using its solutions or slurries in aqueous or non-aqueous solvents or their mixtures.
3. Impregnation of the reservoir layer with thermal agent by placing the reservoir layer in a bath with hot slurry or solution, followed by cooling and crystallization.
4. Coating the electrolyte reservoir surface with a slurry of thermal agent.

In some embodiments secondary porosity in the pre-loaded solid thermal agent is created through introduction of pore-forming agents, which are later removed with heat treatment. Secondary porosity increases the specific surface area of the pre-loaded solid thermal agent that comes in contact with electrolyte once the cell is filled and thus improves kinetics of thermal agent dissolution and/or kinetics of exothermic reaction(s) between the thermal agent and water or other thermal agents.

Sonobuoy Apparatus

In various embodiments the instant battery system may be employed to power a sonobuoy device, the combination of the instant battery system and sonobuoy device is sometimes referred to herein as a sonobuoy apparatus generally intended to operate submerged in an ocean waterbody. Sonobuoys are well known devices used for monitoring underwater sound, and typically include a float, a radio transmitter, battery, and a hydrophone for detecting sound under water. For certain use applications the delivery platform may be an aircraft and the sonobuoy apparatus deployed as such may be exposed to freezing temperatures with the possibility of cell components frosting as the system reaches terminal velocity upon impact with the waterbody. As a result, the battery system may reach a pre-deployment temperature of about −10° C. or lower, and this can have a debilitating effect on battery performance, especially for sonobuoy apparatus' that require a substantially instantaneous high power output once the float is deployed. In such situations, the instant battery system can provide significant, if not enabling, benefit. To this end, the type, amount and position of the thermal agent component should be selected and configured to warm-up the battery cell components to operating temperatures conducive for delivering the requisite power output within the mandated timeframe. In various embodiments the timeframe for achieving the necessary drop in internal cell resistance is within 10 to 300 seconds from impact with the waterbody. In particular embodiments the battery cell warms up to operating temperature within 10 seconds, within 30 second, within 60 seconds, within 100 second, within 200 seconds or within 300 seconds from impact with the waterbody. For instance, in various embodiments the anode structure components and/or the cathode structure components are heated from a temperature of −20° C. or lower (prior to operable breach) to a temperature between 10° C. to 20° C., or greater than 20° C. after thermal agent activation subsequent to operable breach. One of the cell components most sensitive to temperature is the protective membrane, the resistance of which can become prohibitive at temperatures below −10° C., depending on the requisite power needed to operate the sonobuoy device. Accordingly, in certain embodiments the thermal agent is placed nearby the protective membrane and the membrane transitions from a temperature of between −10° C. to −20° C. or lower than −20° C. to a temperature between 10° C. to 20° C., or greater than 20° C. as a result of thermal agent action upon operable breach. With a sufficient amount of thermal agent suitably placed nearby the protective membrane(s), operable breach leads to an amount of heat in excess of that necessary to raise the temperature of the membrane to an operating value (i.e., operating temperature) at which the membrane resistance is conducive for the cell delivering the requisite power to the sonobuoy device. Accordingly, in various embodiments, the battery system is designed such that the amount, location and type of thermal agent employed brings the cell(s), and their associated cell components, to a temperature greater than their operating temperature(s) within a requisite period of time as measured from operable breach, or as measured from the time of impact with the waterbody. In embodiments the aforesaid requisite time frames may be in the range of 5-10 seconds, 10-20 seconds, 20-30 seconds, 30-60 seconds. Moreover, in the aforesaid embodiments the temperature of at least one or more of the anode or cathode structure components (e.g., the substantially impervious ceramic layer) undergoes a considerable increase in temperature within the prescribed time frames. For instance, the lithium ion conductive ceramic layer may undergo a temperature increase of between 5° C. to 10° C., between 10° C.-20° C., between 20° C.-30° C., or between 30° C.-40° C. within the aforesaid time frames.

In various embodiments the waterbody temperature is lower than a transitory operating temperature of the cell or a cell component. For instance, the apparatus may be required to deliver a short duration high power pulse substantially immediately upon waterbody impact or submergence and thereafter the device requires significantly less power commensurate with what the battery system is capable of delivering at the waterbody temperature. During the transitory period, however, the operating temperature of at least some of the cell components (e.g., the protective membrane ceramic layer) will need to be at a temperature above that of the waterbody or else the internal resistance of the cell(s) will be too high to conform to the requisite transitory power need of the sonobuoy. In such instances, the battery system is configured such that thermal agent reaction heats the cell(s) to a temperature beyond that of the waterbody liquid for a time period corresponding to the duration over which the transitory power is delivered. For instance, the battery system deployed for operation in cold ocean water (e.g., 5° C. or lower), and the protective membrane is caused, by the reaction of the thermal agent, to reach a temperature of at least 10 C and preferably 20° C. or greater for a period of at least 10 seconds and more typically between 10 to 60 seconds, over which time the battery system delivers the requisite transitory power.

Battery Pack Configurations

With reference to FIGS. 11-14 there are illustrated a variety of battery pack configurations suitable for use in the instant battery systems.

Figure 11:
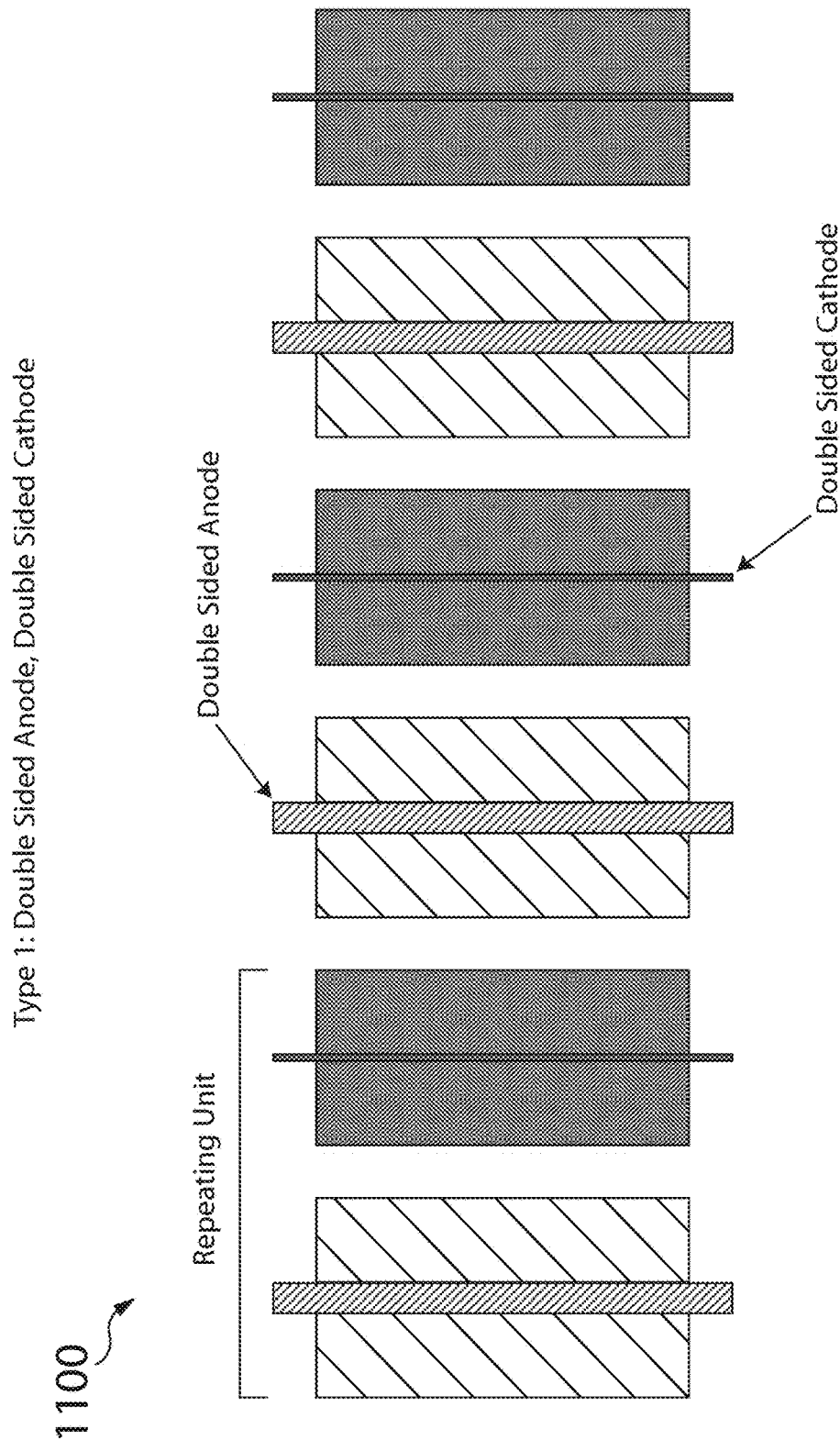
FIG. 11 is a schematic illustration of a battery cell pack suitable for use in a battery system in accordance with an embodiment of the present invention.

With reference to FIG. 11 the instant battery pack is composed of multiple battery cells in accordance with the cells described above. The anode and cathode structures have what are termed double-sided configurations. Double-sided and single sided protected anode configurations suitable for use herein are described fully in U.S. Pat. No. 8,404,388 to Visco et al., and which is incorporated by reference for what it teaches in this regard. These double-sided anodes are composed of lithium electroactive material (e.g., lithium metal foil) isolated on both surfaces by a distinct protective membrane architecture. A single lithium foil (or compact sintered of multiple foils) may be utilized or two separate foils may be incorporated and typically disposed therebetween by a common current collector such as a copper foil or nickel mesh or the like. The double-sided cathode may comprise solid phase electroactive material or an electron transfer medium coated or otherwise disposed on the opposing surfaces of a suitable current collector. In the aforesaid embodiment the repeating unit of the pack structure is defined by a double-sided anode and a double sided cathode.

Figure 12:
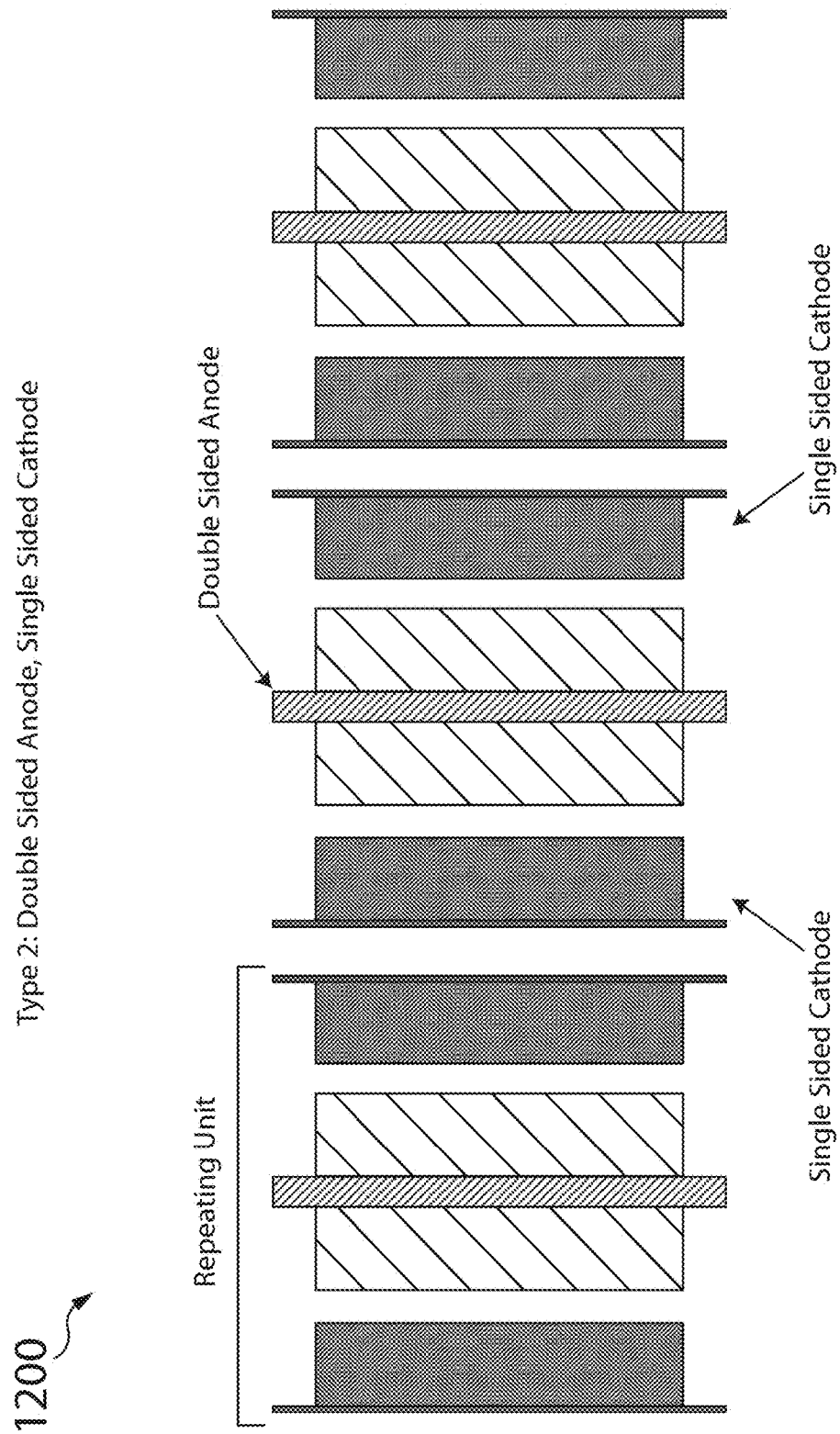
FIG. 12 is a schematic illustration of a battery cell pack suitable for use in a battery system in accordance with an alternative embodiment of the present invention.

With reference to FIG. 12 the instant battery pack is composed of the aforesaid double sided anode and a single sided cathode, whereby the second side of the cathode may be the exposed second surface of the current collector or said second surface may be isolated from contacting the waterbody liquid by using an electrically insulating surface coating (e.g., an epoxy coating). In the instant embodiment illustrated in FIG. 11 the repeating unit is defined by a double sided anode structure and a pair of single sided cathodes adjacent the opposing surfaces of the anode structure. By this expedient a non-active spacing is effected between the second surfaces of opposing cathode structures.

Figure 13:
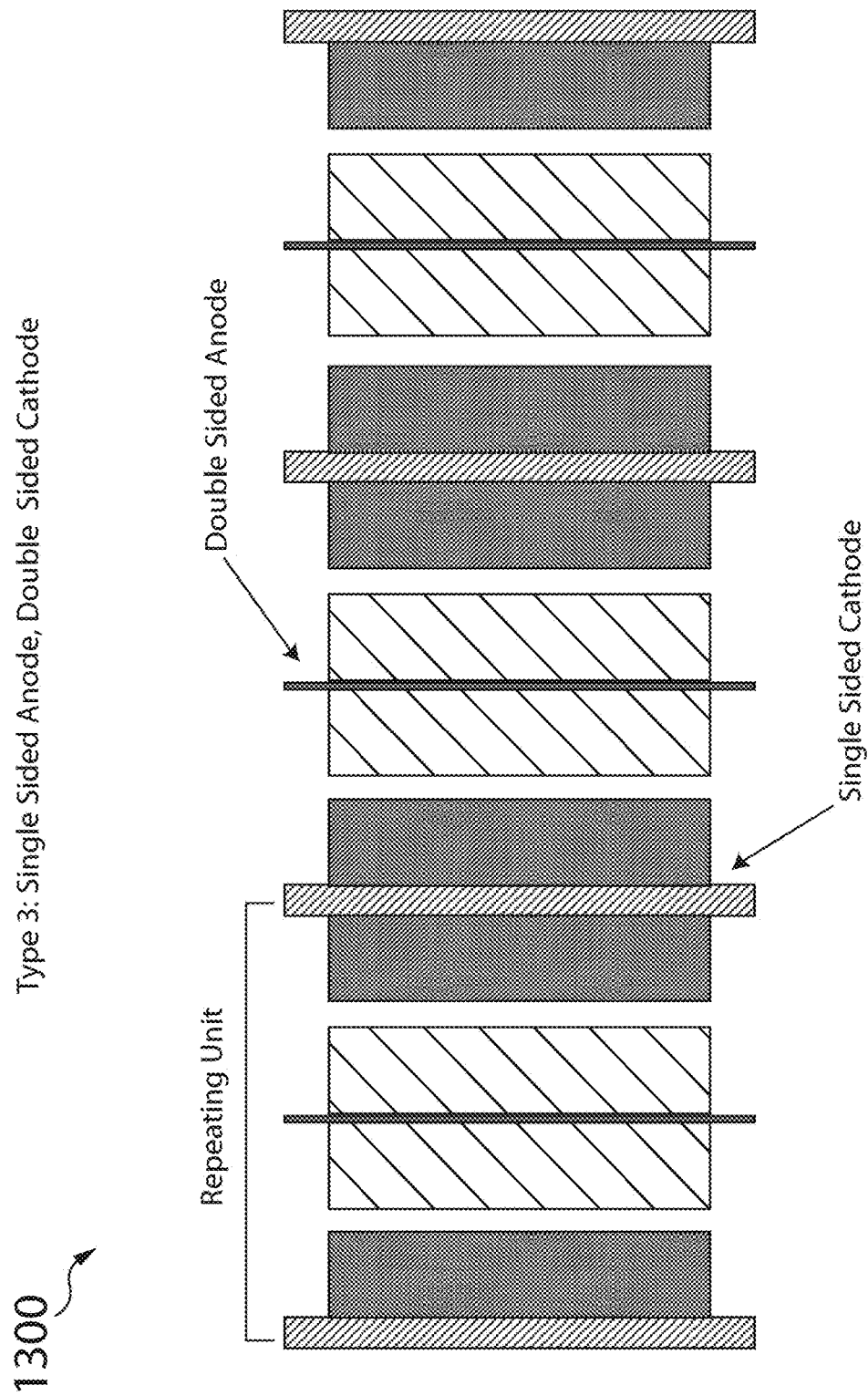
FIG. 13 is a schematic illustration of a battery cell pack suitable for use in a battery system in accordance with an alternative embodiment of the present invention.

Another battery pack embodiment is illustrated in FIG. 13. Therein a single sided anode is employed in combination with a single sided cathode. The anode and cathode structures may share a common current collector, or their respective collectors may be electrically connected to create a bipolar electrode structure. The repeating unit for this embodiment is defined as the anode structure portion of a first bipolar electrode structure and the cathode structure portion of a second bipolar electrode structure.

Figure 14:
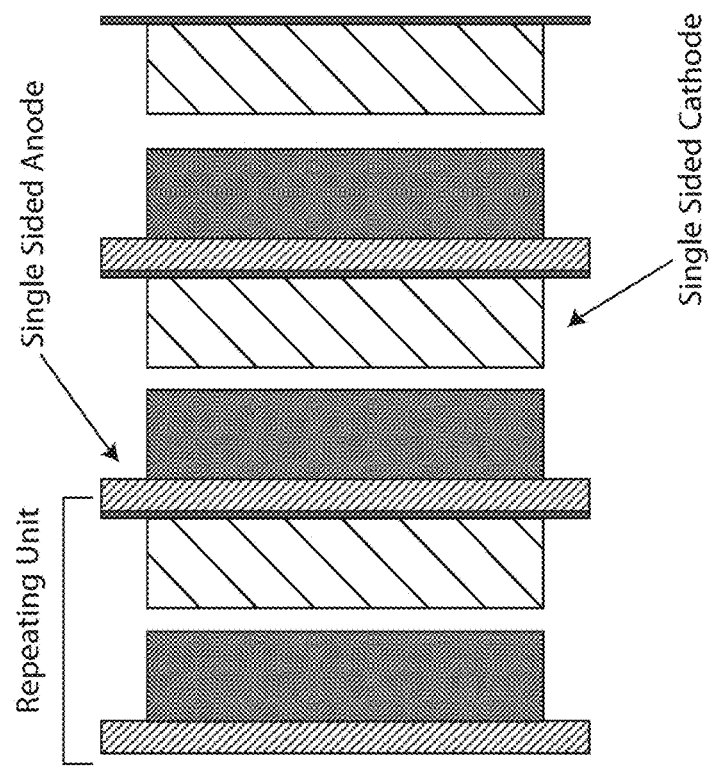
FIG. 14 is a schematic illustration of a battery cell pack suitable for use in a battery system in accordance with an alternative embodiment of the present invention.

In yet another battery pack embodiment, as illustrated in FIG. 14, a double sided cathode may be employed in combination with a single sided anode structure. With regard to the single-sided anode structure, adjacent anodes may be positioned next to each other or in contact, but they do not share a common collector. In a single-sided anode a first current collector surface contacts the lithium metal and the opposing current collector surface (the second surface) is typically coated or covered with an electrically insulating material layer such as an organic polymer or epoxy or multilayer laminate, similar to that used for single sided cathodes.

CONCLUSION

Although the foregoing invention has been described in some detail for purposes of clarity of understanding, it will be apparent that certain changes and modifications may be practiced within the scope of the invention. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A lithium battery cell for providing a requisite amount of electrical power, the battery cell deployed for use and operated in or on a waterbody, the cell comprising:
    a lithium anode structure comprising:
        a lithium anode comprising an electroactive lithium component; and
        a substantially impervious lithium ion conductive layer component positioned adjacent the anode and configured to protect the electroactive lithium from direct contact with waterbody liquid;
    a cathode structure comprising a cathode component, the cathode structure open to the external environment for receiving waterbody liquid such that the waterbody liquid can directly contact the cathode component and serve as an electrolytic medium between the cathode and the lithium anode structure; and
    a thermal agent component positioned to come into direct contact with waterbody liquid as a result of cell deployment, the thermal agent component configured to be activated by contact with waterbody liquid to generate heat for reducing internal cell resistance;
    wherein the contact between the thermal agent component and the waterbody liquid produces a heat evolving corrosion reaction of the thermal agent.

2. The lithium battery cell of claim 1 wherein the thermal agent component is present in sufficient amount to generate ample heat to reduce the internal resistance of one or more of said cell components by an amount satisfactory to enable the cell to deliver the requisite electrical power, whereby without the thermal agent component the one or more cell components would have a prohibitively large internal resistance that would render the cell unable to deliver the requisite power and thus inoperable for its intended purpose.

3. The lithium battery cell of claim 2 wherein the amount of heat generated is sufficient to render the cell operable within 30 seconds of thermal agent activation.

4. The lithium battery cell of claim 2 wherein the amount of heat generated relative to the apparent area of the substantially impervious layer component is at least 5 J/cm2.

5. The lithium battery cell of claim 1 wherein the thermal agent is not an electroactive material for generating ampere-hour capacity for the cell, and the thermal agent is not electro-reduced or electro-oxidized as a result of cell operation and is not configured to provide ampere-hour capacity to the cell.

6. The lithium battery cell of claim 1 wherein the thermal agent is in the form of a powder compact.

7. The lithium battery cell of claim 1 wherein the thermal agent is disposed in direct contact with the cathode structure.

8. The lithium battery cell of claim 1 wherein the cathode structure is porous and the thermal agent is disposed within pores of the cathode structure.

9. The lithium battery cell of claim 1 wherein the thermal agent is disposed in a gap between the cathode and anode structures.

10. The lithium battery cell of claim 1 wherein the thermal agent is a lithium compound.

11. The lithium battery cell of claim 1 wherein the electroactive lithium is lithium metal.

* * * * *